US012756101B2

(12) United States Patent
Li et al.

(10) Patent No.: US 12,756,101 B2
(45) Date of Patent: Oct. 6, 2026

(54) ANTENNA, ANTENNA ARRAY, AND ELECTRONIC DEVICE

(71) Applicants: HUAWEI TECHNOLOGIES CO., LTD., Shenzhen (CN); TSINGHUA UNIVERSITY, Beijing (CN)

(72) Inventors: Yue Li, Beijing (CN); Yongjian Zhang, Beijing (CN); Pengfei Wu, Shanghai (CN); Hanyang Wang, Reading (GB); Mingzhe Hu, Beijing (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 20 days.

(21) Appl. No.: 18/996,844

(22) PCT Filed: Oct. 10, 2023

(86) PCT No.: PCT/CN2023/123681
§ 371 (c)(1),
(2) Date: Jan. 17, 2025

(87) PCT Pub. No.: WO2024/082994
PCT Pub. Date: Apr. 25, 2024

(65) Prior Publication Data

US 2026/0031540 A1 Jan. 29, 2026

(30) Foreign Application Priority Data

Oct. 21, 2022 (CN) ......................... 202211290494.2

(51) Int. Cl.
*H01Q 9/04* (2006.01)
*H01Q 21/06* (2006.01)

(52) U.S. Cl.
CPC ......... *H01Q 9/0428* (2013.01); *H01Q 9/0414* (2013.01); *H01Q 21/065* (2013.01)

(58) Field of Classification Search
CPC .. H01Q 9/0414; H01Q 9/0428; H01Q 9/0457; H01Q 21/065; H01Q 21/24
See application file for complete search history.

(56) References Cited

U.S. PATENT DOCUMENTS

| | | | | |
|---|---|---|---|---|
| 5,406,292 | A | 4/1995 | Schnetzer et al. | |
| 2006/0007044 | A1 * | 1/2006 | Crouch ................ | H01Q 9/0435 343/906 |
| 2022/0255240 | A1 * | 8/2022 | Jia .......................... | H01Q 21/30 |

FOREIGN PATENT DOCUMENTS

| | | | |
|---|---|---|---|
| CN | 110416746 | A | 11/2019 |
| CN | 109524762 | B | 3/2021 |

(Continued)

OTHER PUBLICATIONS

Yang et al., "A Compact Dual-Band Stacked Patch Antenna With Dual Circular Polarizations for BeiDou Navigation Satellite Systems," IEEE Antennas and Wireless Propagation Letters, vol. 18, No. 7, total 5 pages, Institute of Electrical and Electronics Engineers, New York, New York (Jul. 2019).

(Continued)

*Primary Examiner* — Daniel Munoz
(74) *Attorney, Agent, or Firm* — Leydig, Voit & Mayer, Ltd.

(57) ABSTRACT

Embodiments of this application provide an antenna, and an electronic device. The antenna includes a radiating patch layer, a ring-shaped metal layer, a first metal layer, and a feed element. The radiating patch layer includes four radiating patches that are distributed in a 2×2 array. The ring-shaped metal layer is disposed in correspondence with a peripheral edge part of the radiating patch layer, and is coupled and connected to the radiating patch layer. A plurality of metal columns are disposed on the first metal (Continued)

layer. The plurality of metal columns are electrically connected to the ring-shaped metal layer.

20 Claims, 29 Drawing Sheets

(56) References Cited

FOREIGN PATENT DOCUMENTS

| | | | | |
|---|---|---|---|---|
| CN | 113594688 A | | 11/2021 | |
| CN | 114583457 A | | 6/2022 | |
| WO | WO-2024260153 A1 | * | 12/2024 | ............... H05K 1/02 |

OTHER PUBLICATIONS

Wang et al., "Switchable Dual-Band Dual-Sense Circularly Polarized Patch Antenna Implemented by Dual-Band Phase Shifter of +/−90 °," IEEE Transactions on Antennas and Propagation, total 6 pages, Institute of Electrical and Electronics Engineers, New York, New York (Oct. 2021).

Liu et al., "Dual-Band Dual-Circularly Polarized Antenna Array with Printed Ridge Gap Waveguide," IEEE Transactions on Antennas and Propagation, total 6 pages, Institute of Electrical and Electronics Engineers, New York, New York (Aug. 2021).

Li et al., "A Novel Design of Low-Profile Dual-Band Circularly Polarized Antenna with Meta-Surface," IEEE Antennas and Wireless Propagation Letters, vol. 14, total 4 pages, Institute of Electrical and Electronics Engineers, New York, New York (Mar. 2015).

* cited by examiner

ANTENNA, ANTENNA ARRAY, AND ELECTRONIC DEVICE

CROSS-REFERENCE TO RELATED APPLICATIONS

This application is a National Stage of International Patent Application No. PCT/CN2023/123681, filed on Oct. 10, 2023, which claims priority to Chinese Patent Application No. 202211290494.2, filed on Oct. 21, 2022, both of which are hereby incorporated by reference in their entireties.

TECHNICAL FIELD

Embodiments of this application relate to the field of wireless communication, and in particular, to an antenna, an antenna array, and an electronic device.

BACKGROUND

With the expansion of mobile services, a positioning function of electronic devices has become one of essential functions in a series of applications such as an industrial internet and a smart household. As a commonly used antenna in a positioning system of the electronic device, a circularly polarized antenna can avoid a polarization mismatch, and therefore, can improve stability of the positioning system of the electronic device. However, with design requirements of a large screen-to-body ratio and lightness and thinness, design space reserved for an antenna in the electronic device is increasingly limited. Therefore, a miniaturized circularly polarized antenna needs to be provided urgently.

SUMMARY

Embodiments of this application provide an antenna, an antenna array, and an electronic device. The antenna has a low profile, and there is a phase difference between electrical signals on a plurality of radiating patches in the antenna, to implement circular polarization. This helps obtain a miniaturized circularly polarized antenna.

According to a first aspect, an antenna is provided, including a radiating patch layer, a ring-shaped metal layer, a first metal layer, and a feed element. The ring-shaped metal layer is located between the radiating patch layer and the first metal layer. The radiating patch layer includes four radiating patches, and the four radiating patches are distributed in a 2×2 array. The ring-shaped metal layer is disposed in correspondence with a peripheral edge part of the radiating patch layer, and the ring-shaped metal layer is coupled and connected to the radiating patch layer. A plurality of metal columns are disposed on a side that is of the first metal layer and that faces the ring-shaped metal layer, and each of the plurality of metal columns is electrically connected to the ring-shaped metal layer. The feed element is electrically connected to the radiating patch layer, and when the feed element performs feeding, there is a first phase difference between electrical signals on two adjacent radiating patches in a clockwise arrangement direction of the four radiating patches.

In this application, there is a phase difference between the electrical signals on the four radiating patches in the antenna sequentially, to implement circular polarization with a broadside radiation characteristic. In addition, the ring-shaped metal layer and the plurality of metal columns may jointly form a metal fence structure, which is equivalent to a fence-shaped coupling capacitive column existing between the radiating patch layer and the first metal layer. In this way, an operating area of a radiator of the antenna can be expanded, so that the antenna has a low profile without affecting an operating mode of the radiating patch layer. This helps implement miniaturization of the antenna. Therefore, the antenna provided in this embodiment of this application can have the low profile and the circular polarization with the broadside radiation characteristic, so that the antenna can be used in a built-in positioning antenna system of a small electronic device (for example, a mobile phone).

In addition, the four radiating patches distributed in a grid array are used as the radiator of the antenna structure. When the feed element performs feeding, the antenna may operate in a dual band. This helps the antenna operate in an ultra-wideband UWB frequency band, for example, a Channel 5 frequency band (5990.4 MHz to 6988.8 MHz) and a Channel 9 frequency band (7499 MHz to 8486.4 MHz) of the UWB.

With reference to the first aspect, in some implementations of the first aspect, the first phase difference is 90°±45°.

With reference to the first aspect, in some implementations of the first aspect, the antenna further includes a feed structure, and the feed structure includes four feed probes and a rotating feed network. The four feed probes are disposed between the ring-shaped metal layer and the first metal layer, and the rotating feed network is disposed on a side that is of the first metal layer and that is away from the ring-shaped metal layer. The rotating feed network includes a common input port and four branch output ports. The feed element is electrically connected to the common input port, the common input port is electrically connected to the four branch output ports, the four branch output ports are electrically connected to the four feed probes respectively, and the four feed probes are electrically connected to the four radiating patches respectively.

In this application, there is a phase difference between the electrical signals on the four radiating patches in the antenna sequentially by using the feed structure formed by the feed probes and the rotating feed network including one input port and four output ports, to implement circular polarization.

With reference to the first aspect, in some implementations of the first aspect, a projection of the feed probe in a first direction is located on an inner periphery of a projection of the ring-shaped patch layer in the first direction, and the first direction is a direction perpendicular to the radiating patch layer.

In a possible implementation, the rotating feed network is a four-way microstrip power divider, and the feed probe is an L-shaped probe.

With reference to the first aspect, in some implementations of the first aspect, the antenna further includes a grounding plane, and the grounding plane is located on a side that is of the rotating feed network and that is away from the first metal layer. A feed port is provided on the grounding plane, the feed port is electrically connected to the common input port, and the feed port is electrically connected to the feed element.

In this application, the antenna may be grounded through the grounding plane.

With reference to the first aspect, in some implementations of the first aspect, the antenna further includes a first dielectric substrate, a second dielectric substrate, a third dielectric substrate, a fourth dielectric substrate, and a fifth dielectric substrate that are sequentially stacked. The radiating patch layer is disposed on a surface that is of the first dielectric substrate and that is away from the second dielectric substrate. The ring-shaped metal layer is disposed on a surface that is of the second dielectric substrate and that is away from the third dielectric substrate. The four feed probes are disposed on a surface that is of the third dielectric substrate and that is away from the fourth dielectric substrate. The first metal layer is disposed on a surface that is of the fourth dielectric substrate and that is away from the fifth dielectric substrate. The rotating feed network is disposed on a surface that is of the fifth dielectric substrate and that faces the fourth dielectric substrate, and the grounding plane is disposed on a surface that is of the fifth dielectric substrate and that is away from the fourth dielectric substrate.

In this application, the antenna may include the plurality of layers of dielectric substrates that are stacked, to support structures such as the radiating patch layer and the feed network in the antenna.

With reference to the first aspect, in some implementations of the first aspect, a total thickness of the first dielectric substrate, the second dielectric substrate, the third dielectric substrate, the fourth dielectric substrate, and the fifth dielectric substrate is less than or equal to 0.7 mm.

In this application, the thickness of the plurality of layers of dielectric substrates in the antenna is limited to a small range, so that the antenna has the low profile. This helps implement miniaturization of the antenna.

With reference to the first aspect, in some implementations of the first aspect, the ring-shaped metal layer includes four L-shaped metal strips, the L-shaped metal strips form a quadrilateral, and an edge of the quadrilateral is disposed in correspondence with an edge of the radiating patch layer.

With reference to the first aspect, in some implementations of the first aspect, there is a slot between two adjacent radiating patches in a row direction and a column direction of the array.

In this application, there is the slot between adjacent radiating patches. A width of the slot between the radiating patches is adjusted, so that an operating frequency band range of the antenna can be adjusted. This helps further expand a bandwidth of the antenna.

With reference to the first aspect, in some implementations of the first aspect, the width of the slot is greater than or equal to 0.1 mm, and is less than or equal to 0.6 mm.

In this application, the width of the slot between the plurality of radiating patches may be adjusted within a specific range, to adjust an operating frequency band of the antenna.

With reference to the first aspect, in some implementations of the first aspect, the operating frequency band of the antenna includes 5990.4 MHz to 6988.8 MHz and 7499 MHz to 8486.4 MHz.

In this application, the operating frequency band of the antenna can cover dual bands, Channel 5 and Channel 9, in the UWB frequency band.

According to a second aspect, an antenna is provided, including a radiating patch layer, a ring-shaped metal layer, and a feed structure. The feed structure is located between the radiating patch layer and the ring-shaped metal layer. The radiating patch layer includes sixteen radiating patches, and the sixteen radiating patches are distributed in a 4×4 array. The ring-shaped metal layer is disposed in correspondence with a peripheral edge part of the radiating patch layer, a plurality of metal columns are disposed on the ring-shaped metal layer, and each of the plurality of metal columns is electrically connected to the radiating patch layer. The feed structure includes a first feed port and a second feed port, and the first feed port and the second feed port are electrically connected to the radiating patch layer. When the first feed port performs feeding, an electrical signal on the radiating patch layer is a first electrical signal, and when the second feed port performs feeding, an electrical signal on the radiating patch layer is a second electrical signal. Amplitudes of the first electrical signal and the second electrical signal are equal, and a phase difference between the first electrical signal and the second electrical signal is 180°±45°.

In this application, feeding is performed through the first feed port and the second feed port, so that there is the phase difference between the electrical signals on the radiating patch layer of the antenna. In other words, differential feeding is implemented on the antenna, to implement circular polarization with a broadside radiation characteristic. In addition, the ring-shaped metal layer and the plurality of metal columns may jointly form a metal fence structure, which is equivalent to a fence-shaped coupling capacitive column existing between the radiating patch layer and the ring-shaped metal layer. In this way, an operating area of a radiator of the antenna can be expanded, so that the antenna has a low profile without affecting an operating mode of the radiating patch layer. This helps implement miniaturization of the antenna. Therefore, the antenna provided in this embodiment of this application can have the low profile and the circular polarization with the broadside radiation characteristic, so that the antenna can be used in a built-in positioning antenna system of a small electronic device (for example, a mobile phone).

In addition, the sixteen radiating patches distributed in a grid array are used as the radiator of the antenna structure. When feeding is performed through first feed port and the second feed port, the antenna may operate in a dual band. This helps the antenna operate in an ultra-wideband UWB frequency band, for example, a Channel 5 frequency band (5990.4 MHz to 6988.8 MHz) and a Channel 9 frequency band (7499 MHz to 8486.4 MHz) of the UWB.

With reference to the second aspect, in some implementations of the second aspect, the feed structure includes a first feed line, a second feed line, and a third feed line, the first feed line is parallel to the second feed line, and the second feed line is perpendicular to the third feed line. A first end of the first feed line is electrically connected to the second feed line, and the second feed line is electrically connected to the radiating patch layer. The third feed line is electrically connected to the radiating patch layer. A second end of the first feed line includes the first feed port, and the third feed line includes the second feed port.

In this application, differential feeding of the antenna is implemented by using a cross feed circuit including the first feed line, the second feed line, and the third feed line, so that circular polarization of the antenna can be implemented.

With reference to the second aspect, in some implementations of the second aspect, a length of the first feed line is equal to a half of a first wavelength, and the first wavelength is a wavelength corresponding to an operating frequency band of the antenna.

In this application, the first feed line whose length is a half of the operating wavelength of the antenna is used, so that a difference between an electrical signal fed by using a feeding circuit corresponding to the first feed line and the second feed line and an electrical signal fed by using a feeding circuit corresponding to the third feed line is 180°±45°, to implement differential feeding.

With reference to the second aspect, in some implementations of the second aspect, the first feed line, the second feed line, and the third feed line are sequentially disposed in a direction from the ring-shaped metal layer to the radiating patch layer.

In this application, the first feed line, the second feed line, and the third feed line are sequentially disposed for avoidance design. This helps ensure that the first feed line, the second feed line, and the third feed line operate normally.

In a possible implementation, the first feed line is a microstrip line, and the second feed line and the third feed line are L-shaped probes.

With reference to the second aspect, in some implementations of the second aspect, the antenna further includes a matching patch layer, the matching patch layer is located between the radiating patch layer and the feed structure, the matching patch layer is located between the radiating patch layer and the feed structure, the matching patch layer is coupled and connected to the radiating patch layer, and the matching patch layer is electrically connected to the second feed line and the third feed line. The matching patch layer includes four metal patches, and the four metal patches are distributed in a 2×2 array.

In this application, impedance of the antenna may be tuned by using the matching patch layer, to implement impedance matching.

With reference to the second aspect, in some implementations of the second aspect, the plurality of metal columns are located on an outer periphery of the matching patch layer.

With reference to the second aspect, in some implementations of the second aspect, the antenna further includes a first dielectric substrate, a second dielectric substrate, a third dielectric substrate, a fourth dielectric substrate, and a fifth dielectric substrate that are sequentially stacked. The radiating patch layer is disposed on a surface that is of the first dielectric substrate and that is away from the second dielectric substrate. The matching patch layer is disposed on a surface that is of the second dielectric substrate and that is away from the third dielectric substrate. The third feed line is disposed on a surface that is of the third dielectric substrate and that is away from the fourth dielectric substrate. The second feed line is disposed on a surface that is of the fourth dielectric substrate and that is away from the fifth dielectric substrate. The first feed line is disposed on a surface that is of the fifth dielectric substrate and that faces the fourth dielectric substrate.

In this application, the antenna may include the plurality of layers of dielectric substrates that are stacked, to support structures such as the radiating patch layer and the ring-shaped metal layer in the antenna.

With reference to the second aspect, in some implementations of the second aspect, a total thickness of the first dielectric substrate, the second dielectric substrate, the third dielectric substrate, the fourth dielectric substrate, and the fifth dielectric substrate is less than or equal to 0.7 mm.

In this application, the thickness of the plurality of layers of dielectric substrates in the antenna is limited to a small range, so that the antenna has the low profile. This helps implement miniaturization of the antenna.

With reference to the second aspect, in some implementations of the second aspect, the antenna further includes a grounding plane, and the grounding plane is located on a surface that is of the fifth dielectric substrate and that is away from the fourth dielectric substrate. The grounding plane includes the first feed port and the second feed port.

In this application, the antenna may be grounded through the grounding plane.

With reference to the second aspect, in some implementations of the second aspect, the ring-shaped metal layer includes twelve metal strips, the twelve metal strips form a quadrilateral, and an edge of the quadrilateral is disposed in correspondence with an edge of the radiating patch layer.

With reference to the second aspect, in some implementations of the second aspect, there is a slot between two adjacent radiating patches in a row direction and a column direction of the array.

In this application, there is the slot between adjacent radiating patches. A width of the slot between the radiating patches is adjusted, so that an operating frequency band range of the antenna can be adjusted. This helps further expand a bandwidth of the antenna.

With reference to the second aspect, in some implementations of the second aspect, a width of the slot is greater than or equal to 0.1 mm, and is less than or equal to 0.6 mm.

In this application, the width of the slot between the plurality of radiating patches may be adjusted within a specific range, to adjust the operating frequency band of the antenna.

With reference to the second aspect, in some implementations of the second aspect, the operating frequency band of the antenna includes 5990.4 MHz to 6988.8 MHz and 7499 MHz to 8486.4 MHz.

In this application, the operating frequency band of the antenna can cover dual bands, Channel 5 and Channel 9, in the UWB frequency band.

According to a third aspect, an antenna array is provided, including a plurality of antennas according to any one of the first aspect, or including a plurality of antennas according to any one of the second aspect.

With reference to the third aspect, in some implementations of the third aspect, a distance between two adjacent antennas is less than or equal to one tenth of a first wavelength.

With reference to the third aspect, in some implementations of the third aspect, the antenna array includes three antennas, and the three antennas are distributed in two rows and two columns.

According to a fourth aspect, an electronic device is provided, including the antenna array according to any one of the third aspect.

According to a fifth aspect, an electronic device is provided, including the antenna according to any one of the first aspect, and/or including the antenna according to any one of the second aspect.

For beneficial effects of the third aspect to the fifth aspect, refer to the beneficial effects of the first aspect and the second aspect. Details are not described herein again.

DESCRIPTION OF EMBODIMENTS

Figure 1:
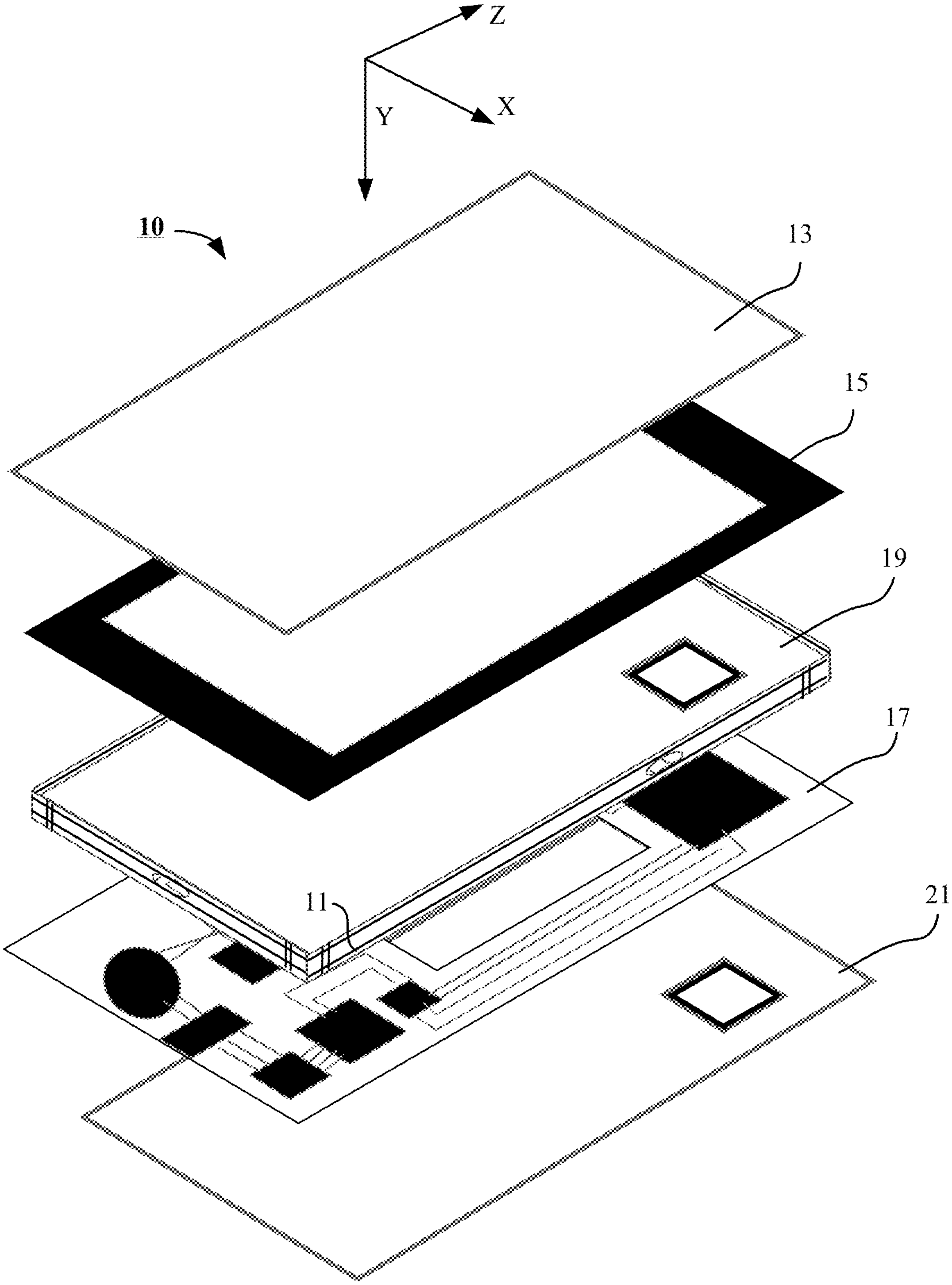
FIG. 1 is a diagram of an electronic device according to an embodiment of this application.

The following describes technical solutions of embodiments in this application with reference to accompanying drawings.

It should be understood that, in this application, "electrical connection" may be understood as a form in which components are physically in contact and are electrically conducted, or may be understood as a form in which different components in a line structure are connected through a physical line that can transmit an electrical signal, such as a printed circuit board (PCB) copper foil or a conducting wire, or may be understood as a form in which components are electrically conducted through indirect coupling without direct physical contact. "Coupling" may be understood as being electrically conducted through indirect coupling. A person skilled in the art may understand that a coupling phenomenon is a phenomenon in which input and output of two or more circuit elements or electrical networks closely cooperate with and affect each other and energy is transmitted from one side to the other side through interaction. Both "connection" and "connected to" may be a mechanical connection relationship or a physical connection relationship. For example, a connection between A and B or that A is connected to B may be that there is a fastening component (such as a screw, a bolt, or a rivet) between A and B, or A and B are in contact with each other and A and B are difficult to be separated.

An x direction in embodiments of this application may be understood as a width direction/length direction of an antenna, a y direction may be understood as a length direction/width direction of the antenna, and a z direction may be understood as a height (thickness) direction of the antenna.

Horizontal dimensions in embodiments of this application may be understood as dimensions on a plane perpendicular to the height/thickness direction of the antenna (x-y plane).

For ease of understanding, the following explains and describes technical terms in embodiments of this application.

Resonance/Resonance frequency: The resonance frequency is also referred to as a resonant frequency. The resonance frequency may be a frequency at which an imaginary part of antenna input impedance is zero. The resonance frequency may have a frequency range, that is, a frequency range in which resonance occurs. A frequency corresponding to a strongest resonance point is a center frequency or a point frequency. A return loss characteristic of the center frequency may be less than −20 dB.

Resonance frequency band: A range of a resonance frequency is the resonance frequency band. A return loss characteristic of any frequency in the resonance frequency band may be less than −6 dB or −5 dB.

Communication frequency band/Operating frequency band: An antenna, regardless of a type, always operates in a specific frequency range (frequency band width). For example, an operating frequency band of an antenna that supports a frequency band of ultra-wideband (UWB) Channel 5 may include 5990.4 MHz to 6988.8 MHz. In other words, the operating frequency band of the antenna includes the frequency band of the UWB Channel 5.

The resonance frequency band and the operating frequency band may be the same or different, or frequency ranges thereof may partially overlap. In some embodiments, the resonance frequency band of the antenna may cover a plurality of operating frequency bands of the antenna.

Constraints such as symmetry (for example, axial symmetry or centrosymmetry), parallelism, perpendicularity, and same (for example, same length and same width) described in embodiments of this application are all relative to a current process level rather than being absolutely strict definitions in a mathematical sense, and a slight deviation is allowed. For example, in some embodiments, that A is parallel to B may be that A is parallel or approximately parallel to B. In a possible example, that A is parallel to B is that an included angle between A and B is between 0° and 10°. In some embodiments, that A is perpendicular to B is that A is perpendicular or approximately perpendicular to B. In a possible example, that A is perpendicular to B is that an included angle between A and B is between 80° and 100°.

Total efficiency of an antenna: The total efficiency of the antenna is a ratio of input power to output power at an antenna port.

Radiation efficiency of an antenna: The radiation efficiency of the antenna is power radiated by the antenna to space (that is, power effectively converted into an electromagnetic wave) and active power input to the antenna. Active power input to an antenna=input power of the antenna−loss power. The loss power mainly includes return loss power and metal ohmic loss power and/or dielectric loss power. The radiation efficiency is a value for measuring a radiation capability of the antenna, and both a metal loss and a dielectric loss are factors affecting the radiation efficiency.

It should be understood that efficiency is generally indicated by a percentage, and there is a corresponding conversion relationship between the efficiency and dB. Efficiency closer to 0 dB indicates better efficiency of the antenna.

Return loss of an antenna: The return loss of the antenna may be understood as a ratio of power of a signal reflected to an antenna port through an antenna circuit to transmit power of the antenna port. A smaller reflected signal indicates a larger signal radiated by the antenna to space and higher radiation efficiency of the antenna. A larger reflected signal indicates a smaller signal radiated by the antenna to space and lower radiation efficiency of the antenna.

The return loss of the antenna may be indicated by an S11 parameter. S11 is a type of S-parameter. S11 indicates a reflection coefficient, and the parameter can indicate whether transmit efficiency of the antenna is high. The S11 parameter is usually a negative number. A smaller value of the S11 parameter indicates a smaller return loss of the antenna and less energy reflected by the antenna, that is, more energy actually entering the antenna and higher total efficiency of the antenna. A larger value of the S11 parameter indicates a larger return loss of the antenna and lower total efficiency of the antenna.

It should be noted that, in engineering, an SIT value of −6 dB is usually used as a standard. When the S11 value of the antenna is less than −6 dB, it may be considered that the antenna can operate normally, or it may be considered that the transmit efficiency of the antenna is high.

Polarization direction of an antenna: At a given point in space, electric field strength E (vector) is a function of time t. Over time, an endpoint of the vector periodically traces out a trajectory in space. If the trajectory is a straight line and is perpendicular to the ground, it is referred to as vertical polarization. If the trajectory is horizontal to the ground, it is referred to as horizontal polarization. When the trajectory is an ellipse or a circle, observe the trajectory along a propagation direction. A right-hand or clockwise rotation over time is referred to as right-hand circular polarization (RHCP). A left-hand or counterclockwise rotation over time is referred to as left-hand circular polarization (RHCP).

Axial ratio (AR) of an antenna: In circular polarization, a trajectory that is periodically traced in space by an endpoint of an electric field vector is an ellipse. A ratio of a major axis to a minor axis of the ellipse is referred to as the axial ratio. The axial ratio is an important performance indicator of a circularly polarized antenna, representing purity of the circular polarization, and is an important indicator for measuring a gain difference of signals in different directions of the entire antenna system. An axial ratio value of the circular polarization of the antenna closer to 1 (which indicates the trajectory that is periodically traced in space by the endpoint of the electric field vector is a circle) indicates better circular polarization performance.

Low-profile antenna: The low-profile antenna may be an antenna whose total height is less than a wavelength corresponding to an operating frequency band of the antenna.

It should be understood that the wavelength corresponding to the operating frequency band of the antenna may be understood as a wavelength corresponding to a center frequency of the operating frequency band of the antenna, or may be understood as a wavelength corresponding to a resonance frequency of the antenna.

Radiation pattern: The radiation pattern may be a pattern in which an electromagnetic field radiated by an antenna is distributed, with spatial angles (including an azimuth angle and an elevation angle), on a spherical surface centered on the antenna with a specific distance as radius.

It should be noted that, based on different characteristics of an antenna radiation pattern, the antenna may be classified into an end-fire antenna, a broadside antenna, an omnidirectional antenna, and the like. The end-fire antenna may be an antenna whose main radiation direction is parallel to a main structural direction of the antenna. The broadside antenna may be an antenna whose main radiation direction is perpendicular to the main structural direction of the antenna. The omnidirectional antenna may be an antenna that implements uniform radiation in all directions on a horizontal plane.

It should be understood that, in a mobile phone, due to restrictions of another module and an actual application scenario, compared with the end-fire antenna and the omnidirectional antenna, the broadside antenna is more conducive to improving utilization efficiency and operating performance of the antenna.

Antenna gain: The antenna gain is, under a condition of equal input power, a ratio of power density of a signal generated by an actual antenna to power density of a signal generated by a desirable radiating element (because the desirable radiating element does not exist, it is replaced with a dipole antenna during actual application) at a same point in space. The antenna gain quantitatively describes a degree to which an antenna concentrates radiation of the input power.

Ground (Ground plane): The ground/ground plane may generally be at least a part of any grounding plane, grounding plate, grounding metal layer, or the like in an electronic device (for example, a mobile phone), or at least a part of any combination of any grounding plane, grounding plate, grounding part, or the like. The "ground" may be configured to ground a component in the electronic device. In an embodiment, the "ground" may be a grounding plane of a circuit board of the electronic device, or may be a grounding plate formed by a middle frame of the electronic device or a grounding metal layer formed by a metal thin film below a screen of the electronic device. In an embodiment, the circuit board may be a printed circuit board (PCB), for example, an 8-layer, 10-layer, or 12-layer to 14-layer board having 8, 10, 12, 13, or 14 layers of conductive materials, or an element that is separated and electrically insulated by using a dielectric layer or an insulation layer such as glass fiber or polymer. In an embodiment, the circuit board includes a dielectric substrate, the grounding plane, and a wiring layer. The wiring layer and the grounding plane are electrically connected through a via. In an embodiment, parts such as a display, a touchscreen, an input button, a transmitter, a processor, a memory, a battery, a charging circuit, and a system on chip (SoC) structure may be installed on or connected to the circuit board, or electrically connected to the wiring layer and/or the grounding plane in the circuit board. For example, a radio frequency source is disposed at the wiring layer.

Any of the foregoing grounding plane, grounding plate, or grounding metal layer is made of a conductive material. In an embodiment, the conductive material may be any one of the following materials: copper, aluminum, stainless steel, brass and alloys thereof, copper foils on insulation laminates, aluminum foils on insulation laminates, gold foils on insulation laminates, silver-plated copper, silver-plated copper foils on insulation laminates, silver foils on insulation laminates and tin-plated copper, cloth impregnated with graphite powder, graphite-coated laminates, copper-plated laminates, and brass-plated laminates and aluminum-plated laminates. A person skilled in the art may understand that the grounding plane/grounding plate/grounding metal layer may alternatively be made of another conductive material.

The technical solutions provided in embodiments of this application are applicable to an electronic device that uses one or more of the following communication technologies: a Bluetooth (BT) communication technology, a global positioning system (GPS) communication technology, a wireless fidelity (Wi-Fi) communication technology, a global system for mobile communications (GSM) communication technology, a wideband code division multiple access (WCDMA) communication technology, a long term evolution (LTE) communication technology, a 5G communication technology, and other future communication technologies. The electronic device in embodiments of this application may be a mobile phone, a tablet computer, a notebook computer, a smart household, a smart band, a smart watch, a smart helmet, smart glasses, or the like. Alternatively, the electronic device may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, an electronic device in a 5G network, an electronic device in a future evolved public land mobile network (PLMN), or the like. This is not limited in embodiments of this application. FIG. 1 shows an example of an electronic device according to an embodiment of this application. An example in which the electronic device is a mobile phone is used for description.

As shown in FIG. 1, an electronic device 10 may include a cover 13, a display/display module 15, a printed circuit board (PCB) 17, a middle frame 19, and a rear cover 21. It should be understood that, in some embodiments, the cover 13 may be a cover glass, or may be replaced with a cover of another material, for example, a cover of an ultra-thin glass material or a cover of a PET (Polyethylene terephthalate, polyethylene terephthalate) material.

The cover 13 may be tightly attached to the display module 15, and may be mainly configured to protect the display module 15 for dust resistance.

In an embodiment, the display module 15 may include a liquid crystal display (LCD) panel, a light-emitting diode (LED) display panel, an organic light-emitting diode (OLED) display panel, or the like. This is not limited in this application.

The middle frame 19 is mainly configured to support the entire device. FIG. 1 shows that the PCB 17 is disposed between the middle frame 19 and the rear cover 21. It should be understood that, in an embodiment, the PCB 17 may alternatively be disposed between the middle frame 19 and the display module 15. This is not limited in this application. The printed circuit board PCB 17 may use a flame-retardant (FR-4) dielectric board, or may use a Rogers dielectric board, or may use a hybrid dielectric board of Rogers and FR-4, or the like. Herein, FR-4 is a grade designation for a flame-resistant material, and the Rogers dielectric board is a high-frequency board. An electronic element, for example, a radio frequency chip is carried on the PCB 17. In an embodiment, a metal layer may be disposed on the printed circuit board PCB 17. The metal layer may be configured to ground the electronic element carried on the printed circuit board PCB 17, or may be configured to ground another element, for example, a support antenna or a frame antenna. The metal layer may be referred to as a ground plane, a grounding plate, or a grounding plane. In an embodiment, the metal layer may be formed by etching metal on a surface of any dielectric board in the PCB 17. In an embodiment, the metal layer configured for grounding may be disposed on a side that is of the printed circuit board PCB 17 and that is close to the middle frame 19. In an embodiment, an edge of the printed circuit board PCB 17 may be considered as an edge of a grounding plane of the PCB 17. In an embodiment, the metal middle frame 19 may also be configured to ground the foregoing element. The electronic device 10 may further have another ground plane/grounding plate/grounding plane, as described above. Details are not described herein again.

The electronic device 10 may further include a battery (not shown in the figure). The battery may be disposed between the middle frame 19 and the rear cover 21, or may be disposed between the middle frame 19 and the display module 15. This is not limited in this application. In some embodiments, the PCB 17 is divided into a mainboard and a subboard. The battery may be disposed between the mainboard and the subboard. The mainboard may be disposed between the middle frame 19 and an upper edge of the battery, and the subboard may be disposed between the middle frame 19 and a lower edge of the battery.

The electronic device 10 may further include a frame 11. The frame 11 may be made of a conductive material such as metal. The frame 11 may be disposed between the display module 15 and the rear cover 21, and extend around a periphery of the electronic device 10. The frame 11 may have four sides surrounding the display module 15, to help fasten the display module 15. In an implementation, the frame 11 made of a metal material may be directly configured as a metal frame of the electronic device 10 to form an appearance of the metal frame, and is applicable to a metal industrial design (ID). In another implementation, an outer surface of the frame 11 may alternatively be made of a non-metal material, for example, a plastic frame, to form an appearance of a non-metal frame, and is applicable to a non-metal ID.

The middle frame 19 may include the frame 11, and the middle frame 19 including the frame 11 is configured as an integrated component, and may support an electronic component in the entire device. The cover 13 and the rear cover 21 are respectively covered along an upper edge and a lower edge of the frame, to form a casing or a housing of the electronic device. In an embodiment, the cover 13, the rear cover 21, the frame 11, and/or the middle frame 19 may be collectively referred to as the casing or the housing of the electronic device 10. It should be understood that, the "casing or housing" may be used to indicate a part or all of any one of the cover 13, the rear cover 21, the frame 11, or the middle frame 19, or indicate a part or all of any combination of the cover 13, the rear cover 21, the frame 11, or the middle frame 19.

Alternatively, the frame 11 may not be considered as a part of the middle frame 19. In an embodiment, the frame 11 and the middle frame 19 may be connected and integrally formed. In another embodiment, the frame 11 may include a protruding part extending inward, to be connected to the middle frame 19 through, for example, a spring or a screw, or welding. The protruding part of the frame 11 may be further configured to receive a feed signal, so that at least a part of the frame 11 is configured as a radiator of the antenna to transmit/receive a radio frequency signal. There is a slot 42 between the middle frame 30 and the part of frame that is configured as the radiator, to ensure that the radiator of the antenna has a good radiation environment, so that the antenna has a good signal transmission function.

The rear cover 21 may be a rear cover made of a metal material, or may be a rear cover made of a non-conductive material, such as a glass rear cover, a plastic rear cover, or another non-metallic rear cover.

FIG. 1 shows only an example of some parts included in the electronic device 10. Actual shapes, actual sizes, and actual structures of these parts are not limited to those in FIG. 1.

With the expansion of mobile services, a positioning function of electronic devices has become one of essential functions in a series of applications such as an industrial internet and a smart household. As a commonly used antenna in a positioning system of an electronic device, a circularly polarized antenna can avoid a polarization mismatch, and therefore, stability of the positioning system can be greatly improved. For example, specifically, an array including a plurality of circularly polarized antennas may be used to implement positioning in an elevation plane or an azimuth plane. However, with design requirements of a large screen-to-body ratio and lightness and thinness, design space reserved for an antenna in an electronic device is increasingly limited. Therefore, a miniaturized circularly polarized antenna needs to be provided urgently.

In view of the foregoing content, embodiments of this application provide an antenna, an antenna array, and an electronic device. The antenna has a low profile, and there is a phase difference between electrical signals on a plurality of radiating patches in the antenna, to implement circular polarization. This helps obtain a miniaturized circularly polarized antenna.

The following describes a structure of the antenna provided in embodiments of this application with reference to the accompanying drawings.

Figure 2:
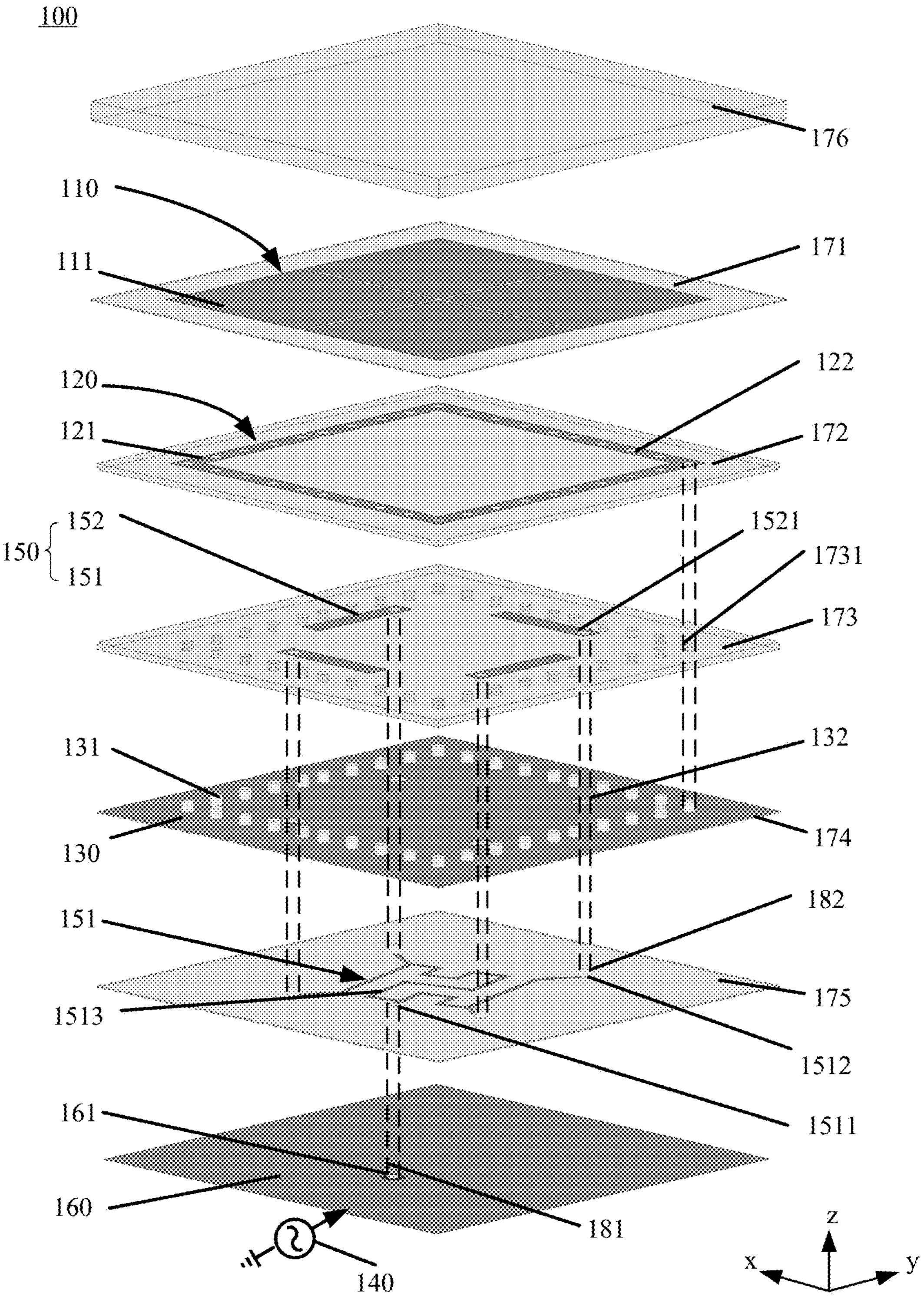
FIG. 2 is a diagram of a structure of an antenna according to an embodiment of this application.
Figure 3:
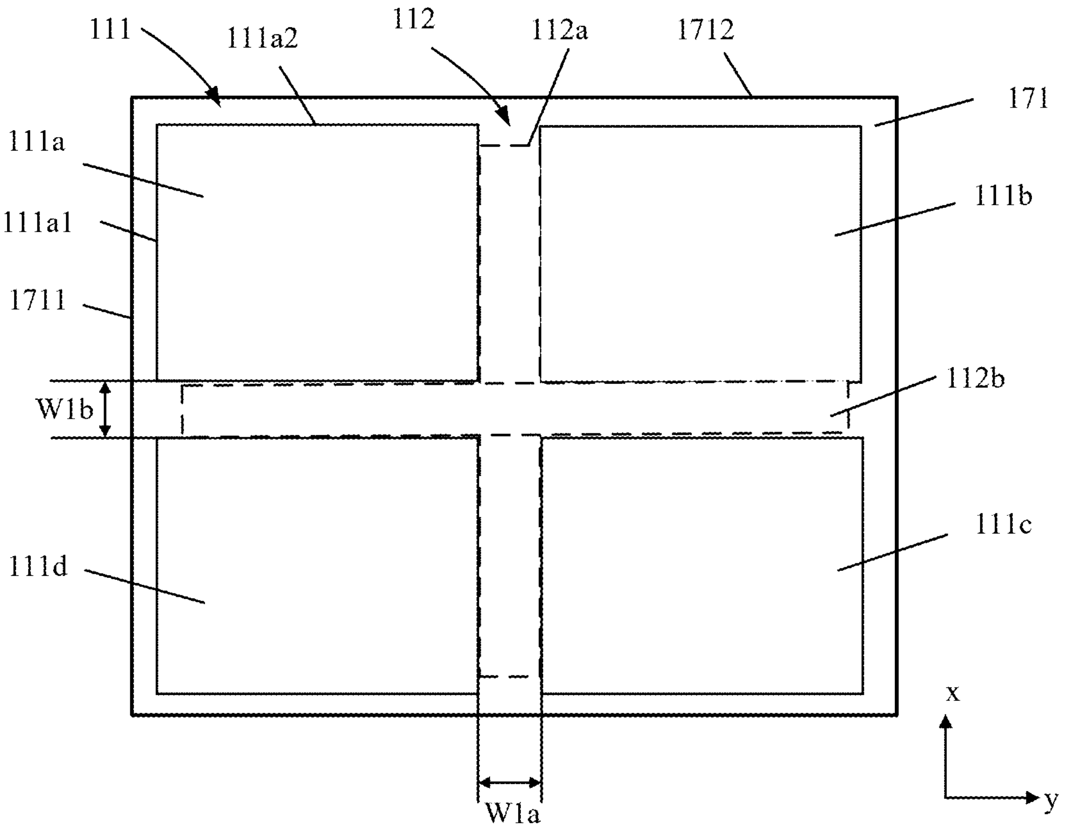
FIG. 3 is a top view of a radiating patch layer according to an embodiment of this application.
Figure 4:
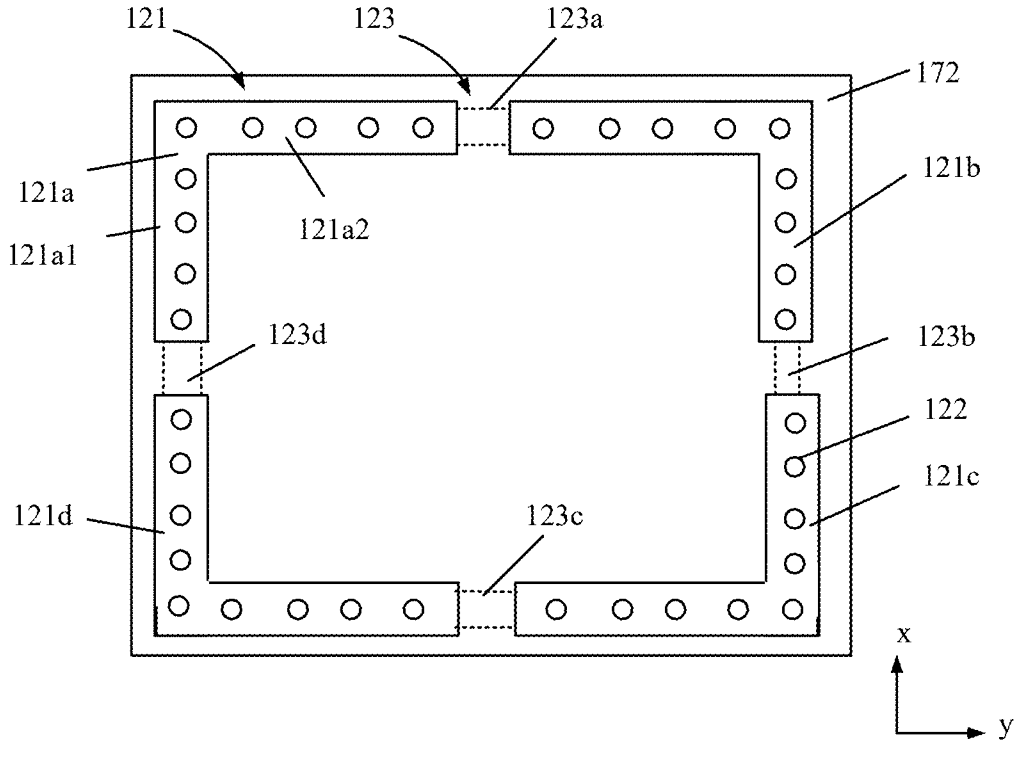
FIG. 4 is a top view of a ring-shaped metal layer according to an embodiment of this application.
Figure 5:
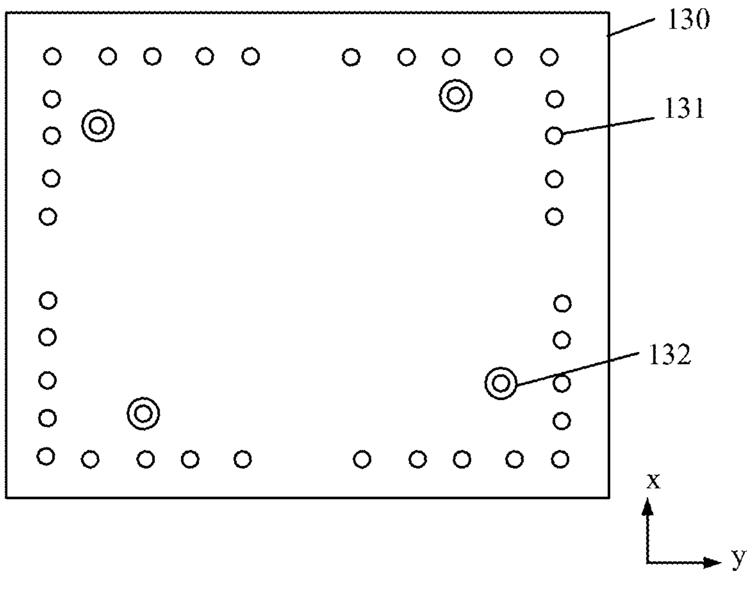
FIG. 5 is a top view of a first metal ground plane according to an embodiment of this application.

FIG. 2 to FIG. 5 are diagrams of a structure of an antenna 100 according to an embodiment of this application. FIG. 2 is an exploded diagram of the antenna 100 according to an embodiment of this application. FIG. 3 is a schematic top view of a radiating patch layer 110 shown in FIG. 2. FIG. 4 is a schematic top view of a ring-shaped metal layer 120 shown in FIG. 2. FIG. 5 is a schematic top view of a first metal layer 130 shown in FIG. 2. The antenna 100 may be used in the electronic device 10 shown in FIG. 1.

As shown in FIG. 2, the antenna 100 may include the radiating patch layer 110, the ring-shaped metal layer 120, and the first metal layer 130. The ring-shaped metal layer 120 may be located between the radiating patch layer 110 and the first metal layer 130.

With reference to FIG. 2 and FIG. 3, the radiating patch layer 110 may include four radiating patches 111. The four radiating patches 111 may be distributed in a 2×2 array. In some embodiments, there is a slot between two adjacent radiating patches 111 in a row direction and a column direction of the array.

For example, as shown in FIG. 3, the four radiating patches 111 may include radiating patches 111*a*, 111*b*, 111*c*, and 111*d*. Two first slots 112 are formed between the radiating patches 111*a*, 111*b*, 111*c*, and 111*d*. For example, widths of the two first slots 112 may be the same.

For example, the two first slots 112 may include a first slot 112*a* and a first slot 112*b*, and a width W1*a* (a dimension in a y-axis direction) of the first slot 112*a* and a width W1*b* (a dimension in an x-axis direction) of the first slot 112*b* are the same.

In some embodiments, the width of the first slot 112 may be greater than or equal to 0.1 mm, and is less than or equal to 0.6 mm. For example, as shown in FIG. 3, the width W1*a* of the first slot 112*a* and the width W1*b* of the first slot 112*b* may be 0.2 mm.

It should be understood that a specific value of the width of the first slot 112 is merely an example, and may be adjusted based on actual production or design. This is not limited in this application.

In some embodiments, the radiating patch 111 may be but is not limited to a circular metal patch or a square metal patch.

For example, as shown in FIG. 3, the radiating patches 111*a*, 111*b*, 111*c*, and 111*d* may be square metal patches, and horizontal dimensions of the radiating patches 111*a*, 111*b*, 111*c*, and 111*d* may be 7.75 mm×7.75 mm. This is not limited in this application.

It should be understood that shapes and horizontal dimensions of the radiating patches 111*a*, 111*b*, 111*c*, and 111*d* are merely examples, and may be adjusted based on actual production and design. This is not limited in this application.

In some embodiments, the antenna 100 may further include a first dielectric substrate 171. The first dielectric substrate 171 may be disposed between the radiating patch layer 110 and the ring-shaped metal layer 120, and is configured to support the radiating patch layer 110. For example, the radiating patch layer 110 may be disposed on an upper surface of the first dielectric substrate 171 (a side that is of the first dielectric substrate 171 and that is away from the ring-shaped metal layer 120).

In some embodiments, edges of the four antenna radiating patches 111 may be parallel to edges of the first dielectric substrate 171. For example, as shown in FIG. 3, a first edge 111*a*1 of the radiating patch 111*a* may be parallel to a first edge 1711 of the first dielectric substrate 171, and a second edge 111*a*2 of the radiating patch 111*a* may be parallel to a second edge 1712 of the first dielectric substrate 171.

In some embodiments, the radiating patch layer 110 may be formed by etching the first dielectric substrate 171.

With reference to FIG. 2 and FIG. 4, the ring-shaped metal layer 120 may be disposed in correspondence with a peripheral edge part of the radiating patch layer 110, and is coupled and connected to the radiating patch layer 110. In other words, a projection of the ring-shaped metal layer 120 in a first direction and a projection of the peripheral edge part of the radiating patch layer 110 in the first direction overlap. The first direction may be a direction perpendicular to the radiating patch layer 110, that is, an x-axis direction shown in FIG. 2.

It should be understood that the peripheral edge part of the radiating patch layer 110 may be understood as a part that is of the radiating patch layer 110 and that is close to an outer contour.

For example, the ring-shaped metal layer 120 may include four L-shaped metal strips 121. The four L-shaped metal strips 121 may form a quadrilateral, and an edge of the quadrilateral may be disposed in correspondence with an edge of the radiating patch layer 110.

For example, as shown in FIG. 4, the four L-shaped metal strips 121 may include L-shaped metal strips 121*a*, 121*b*, 121*c*, and 121*d*. As shown in FIG. 2, the L-shaped metal strips 121*a*, 121*b*, 121*c*, and 121*d* may be respectively disposed in correspondence with the radiating patches 111*a*, 111*b*, 111*c*, and 111*d*. In other words, projections of the L-shaped metal strips 121*a*, 121*b*, 121*c*, and 121*d* in the first direction (namely, the z-axis direction) and projections of edge parts of the radiating patches 111*a*, 111*b*, 111*c*, and 111*d* in the first direction (namely, the z-axis direction) may overlap respectively.

For example, the L-shaped metal strip 121*a* may include a first metal strip segment 121*a*1 and a second metal strip segment 121*a*2 that are perpendicular to each other. The first metal strip segment 121*a*1 may be disposed in correspondence with an edge part of the first edge 111*a*1 of the radiating patch 111*a*, and the second metal strip segment 121*a*2 may be disposed in correspondence with an edge part of the second edge 111*a*2 of the radiating patch 111*a*. In other words, a projection of the first metal strip segment 121*a*1 in the first direction and a projection of the edge part of the first edge 111*a*1 in the first direction overlap, and a projection of the second metal strip segment 121*a*2 in the first direction and a projection of the edge part of the second edge 111*a*2 in the first direction overlap.

In addition, a plurality of second slots 123 provided in correspondence with the two first slots 112 may be formed between the four L-shaped metal strips 121. For example, as shown in FIG. 4, the plurality of second slots 123 may include second slots 123*a*, 123*b*, 123*c*, and 123*d*. The second slots 123*a* and 123*c* may be provided in correspondence with the first slot 112*a*, and the second slots 123*b* and 123*d* may be provided in correspondence with the first slot 112*b*. In other words, widths of the second slots 123*a*, 123*b*, 123*c*, and 123*d* are all equal to the widths of the first slots 112*a* and 112*b*.

For example, the widths of the second slots 123*a*, 123*b*, 123*c*, and 123*d* may be 0.2 mm. This is not limited in this application.

In some embodiments, the antenna 100 may further include a second dielectric substrate 172. The second dielectric substrate 172 may be disposed between the ring-shaped metal layer 120 and the first metal layer 130, and is configured to support the ring-shaped metal layer 120. For example, the ring-shaped metal layer 120 may be disposed on an upper surface of the second dielectric substrate 171 (a side that is of the second dielectric substrate 172 and that is away from the first metal layer 130).

With reference to FIG. 2 and FIG. 5, a plurality of metal columns 131 may be disposed on the first metal layer 130. Each of the plurality of metal columns 131 may be electrically connected to the ring-shaped metal layer 120. In other words, the ring-shaped metal layer 120 may be electrically connected to the first metal layer 130 through the plurality of metal columns 131.

For example, the plurality of metal columns 131 may be spaced from each other, and are disposed in correspondence with the four L-shaped metal strips 121. For example, first calibration positions 122 may be provided on the four L-shaped metal strips 121, and the plurality of metal columns 131 are electrically connected to the four L-shaped metal strips 121 at the first calibration positions 121.

It should be understood that the metal column on a dielectric substrate layer may be understood as a metal blind via. The metal blind via is an opening at corresponding positions at one dielectric substrate layer or several consecutive dielectric substrate layers among dielectric substrate layers that are stacked, and a metal plating layer is disposed on an inner wall of the via to implement a conductive function of the metal blind via. For example, in some embodiments, the plurality of metal columns 131 may be specifically metal blind vias. The plurality of metal blind vias penetrate through the second dielectric substrate 172, so that the first metal layer 130 is electrically connected to the ring-shaped patch layer 120.

In the technical solutions provided in this application, the ring-shaped metal layer 120 and the plurality of metal columns 131 may jointly form a metal fence structure, which is equivalent to a fence-shaped coupling capacitive column existing between the radiating patch layer 110 and the first metal layer 130. In this way, an operating area of a radiator of the antenna 100 can be expanded, so that the antenna 100 can have a low profile without affecting an operating mode of the radiating patch layer 110. This helps implement miniaturization of the antenna 100.

It should be understood that, to meet different requirements of actual production and design, a miniaturization degree of the antenna 100 may be adjusted by adjusting dimensions of the structure of the ring-shaped metal layer 120 and a quantity, locations, and heights of the plurality of metal columns 131.

In some embodiments, as shown in FIG. 2, the antenna 100 may further include a fourth dielectric substrate 174. The fourth dielectric substrate 174 may be located on a side that is of the first metal layer 130 and that is away from the ring-shaped metal layer 120, and is configured to support the first metal layer 130. In other words, the first metal layer 130 may be disposed on an upper surface of the fourth dielectric substrate 174.

As shown in FIG. 2, the antenna 100 may further include a feed element 140. The feed element 140 may be electrically connected to the radiating patch layer 110, to feed the antenna 100. When the feed element 140 performs feeding, there is a first phase difference between electrical signals on two adjacent radiating patches 111 in a clockwise arrangement direction of the four radiating patches 111 of the antenna, to implement circular polarization, so that the antenna 100 can generate a broadside radiation pattern in which polarization is circular polarization.

For example, with reference to FIG. 2 and FIG. 3, when the feed element 140 performs feeding, there is a phase difference of about 90°, for example, a phase difference of 90°±45°, between electrical signals on the radiating patches 111*a*, 111*b*, 111*c*, and 111*d* sequentially in the clockwise direction, to implement circular polarization. For example, phases of the electrical signals on the radiating patches 111*a*, 111*b*, 111*c*, and 111*d* of the antenna may be sequentially 0°, 90°, 180°, and 270°. This is not limited in this application.

It should be noted that the phase difference of 90°±45° may be understood as a phase difference of 90°, allowing for a maximum error value of 45°.

It should be further noted that, that there is a first phase difference between electrical signals on two adjacent radiating patches 111 in a clockwise arrangement direction of the four radiating patches 111 of the antenna may also be understood that there is a second phase difference between the electrical signals on the two adjacent radiating patches 111 in a counterclockwise arrangement direction of the four radiating patches 111 of the antenna. The first phase difference and the second phase difference may be opposite in sign.

Figure 6:
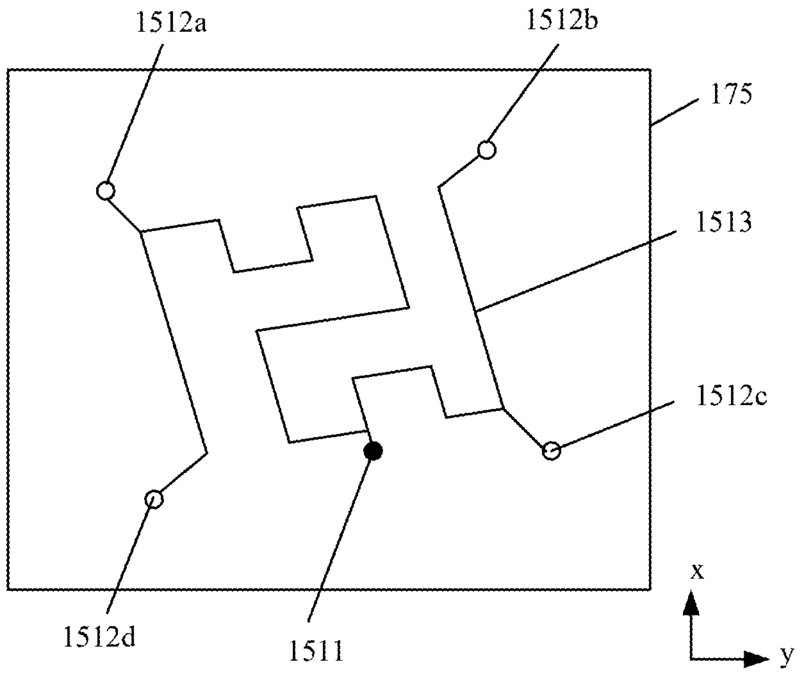
FIG. 6 is a top view of a rotating feed network according to an embodiment of this application.
Figure 7:
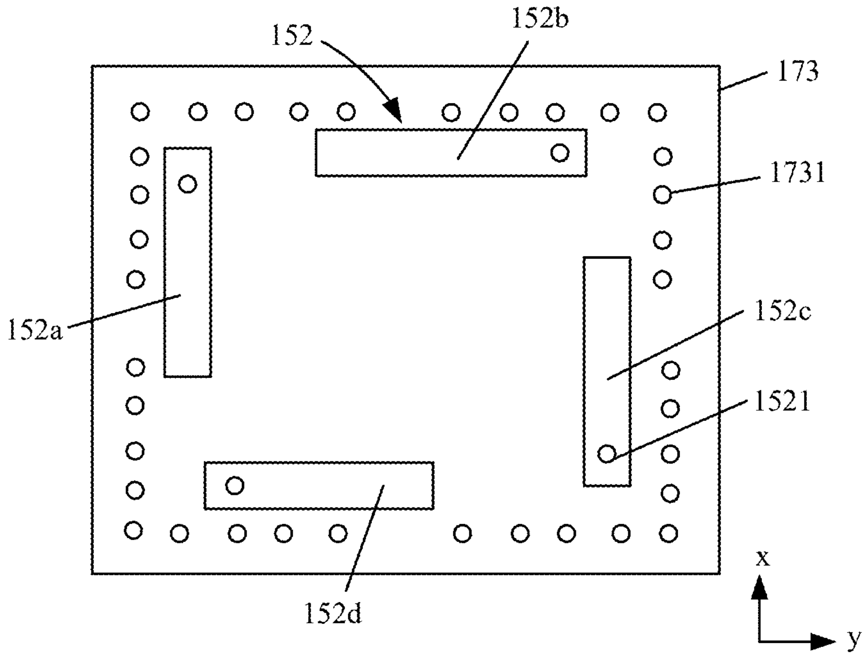
FIG. 7 is a top view of a feed probe according to an embodiment of this application.

In some embodiments, as shown in FIG. 2, the antenna 100 may further include a feed structure 150. FIG. 6 is a schematic top view of a rotating feed network 151 shown in FIG. 2. FIG. 7 is a schematic top view of a feed probe 152 shown in FIG. 2.

With reference to FIG. 2, FIG. 6, and FIG. 7, the feed structure 150 may include a rotating feed network 151 and four feed probes 152.

The four feed probes 152 may be located between the ring-shaped metal layer 120 and the first metal layer 130. The rotating feed network 150 may be disposed on the side that is of the first metal layer 130 and that is away from the ring-shaped metal layer 120. The rotating feed network 151 may include a common input port 1511 and four branch output ports 1512. The feed element 140 may be electrically connected to the common input port 2711, and is configured to feed the antenna 100. The common input port 1511 may be electrically connected to the four branch output ports 1512 separately. The four branch output ports 1512 may be electrically connected to the four feed probes 152 respectively, and the four feed probes 152 may be electrically connected to the four radiating patches 111 respectively, to feed the four radiating patches 111.

In some embodiments, as shown in FIG. 6, the common input port 1511 may be electrically connected to the four branch output ports 1512 through a first feed line 1513 (for example, a microstrip line or a strip line).

When the feed element 140 performs feeding at the common input port 1511, there may be a phase difference between electrical signals at the four branch output ports 1512 sequentially. For example, as shown in FIG. 6, the four branch output ports 1512 may include branch output ports 1512*a*, 1512*b*, 1512*c*, and 1512*d*. When feeding is performed at the common input port 2711, amplitudes of the electrical signals between the branch output ports 1512*a*, 1512*b*, 1512*c*, and 1512*d* are equal, and the phase difference is 90°±45°.

For example, the rotating feed network 151 may be a four-way microstrip power divider.

It should be understood that the specific form of the rotating feed network 151 is merely an example, and may be adjusted based on actual production and design. This is not limited in this application.

In some embodiments, as shown in FIG. 7, the four feed probes 152 may include feed probes 152*a*, 152*b*, 152*c*, and 152*d* that are disposed in a rotationally symmetric manner. The feed probes 152*a*, 152*b*, 152*c*, and 152*d* may be coupled and connected to the radiating patches 111*a*, 111*b*, 111*c*, and 111*d* respectively.

In some embodiments, projections of the four feed probes 152 in the first direction and a projection of the radiating patch layer 110 in the first direction may partially overlap.

In some embodiments, the projections of the four feed probes 152 in the first direction (namely, the z-axis direction) may be located in an inner periphery of the projection of the ring-shaped metal layer 120 in the first direction. In other words, the four feed probes 152 and the ring-shaped metal layer 120 are disposed in a staggered manner.

In some implementations, with reference to FIG. 2 and FIG. 7, the four feed probes 152 may be disposed away from a central axis of the radiating patch layer 110. For example, a central axis of the feed probes 152 along the y-axis direction and a central axis of the radiating patch layer 110 along the y-axis direction do not overlap.

It should be understood that the relative positions of the four feed probes 152 are merely examples, and may be adjusted based on actual production and design. This is not limited in this application.

In some embodiments, as shown in FIG. 2, the antenna 200 may further include a third dielectric substrate 173 and a fifth dielectric substrate 175 that are stacked. The third dielectric substrate 173 may be disposed between the ring-shaped metal layer 120 and the first metal layer 150, and is configured to support the four feed probes 152. In other words, the four feed probes 152 may be disposed on an upper surface of the third dielectric substrate 173 (a side that is of the third dielectric substrate 173 and that is away from the first metal layer 130). The fifth dielectric substrate 175 may be disposed on the side that is of the first metal layer 130 and that is away from the four feed probes 152, and is configured to support the rotating feed network 151. In other words, the rotating feed network 151 may be disposed on an upper surface of the fifth dielectric substrate 175 (a side that is of the fifth dielectric substrate 175 and that faces the first metal layer 130).

In some embodiments, as shown in FIG. 2, the antenna 100 may further include four first metal blind vias 182. Ends of the four first metal blind vias 182 on one side may be electrically connected to the four branch output ports 1512 respectively, and ends of the four first metal blind vias 182 on the other side are electrically connected to the four feed probes 152 respectively. That is, the four branch output ports 1512 are electrically connected to the four feed probes 152 through the first metal blind vias 182, to feed the four feed probes 152.

For example, as shown in FIG. 7, a second calibration position 1521 may be provided on each of the four feed probes 152, and the first metal blind via 182 is electrically connected to the feed probe 152 at the second calibration position 1521.

Figure 8:
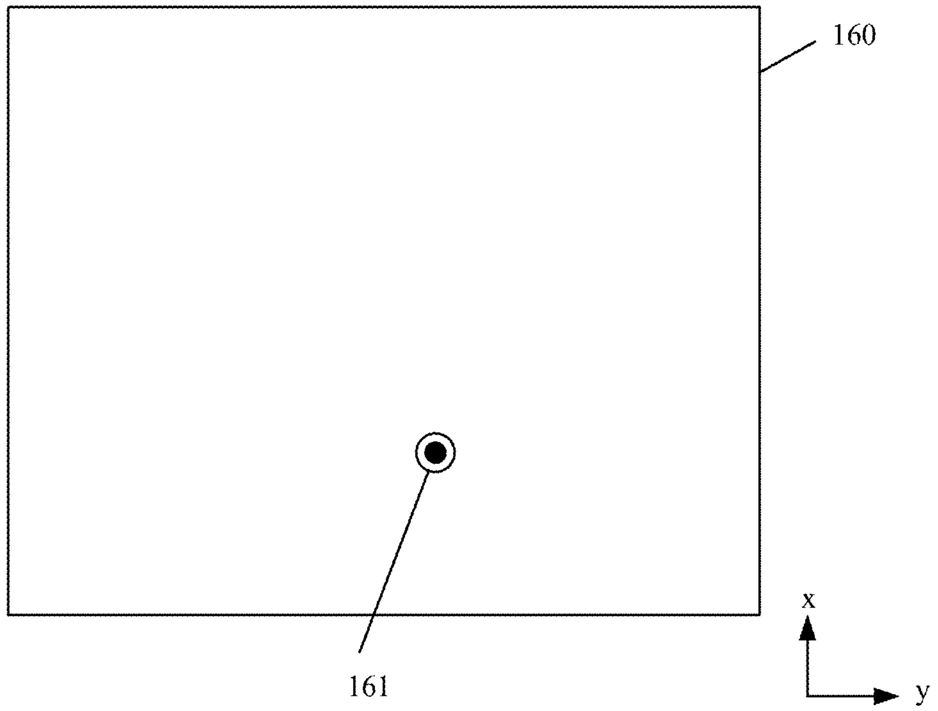
FIG. 8 is a top view of a second metal ground plane according to an embodiment of this application.

In some embodiments, as shown in FIG. 2, the antenna 100 may further include a grounding plane 160. With reference to FIG. 8, the following describes an example of a structure of the grounding plane 160 provided in an embodiment of this application. FIG. 8 is a schematic top view of the grounding plane 160 shown in FIG. 2.

With reference to FIG. 2 and FIG. 8, the grounding plane 160 may be disposed on a side that is of the rotating feed network 151 and that is away from the first metal layer 130. For example, the grounding plane 160 may be disposed on a lower surface of the fifth dielectric substrate 175 (a side that is of the fifth dielectric substrate 175 and that is away from the first metal layer 130), and is used as a ground (GND) plane of the antenna 100.

It should be understood that the grounding plane 160 is used as the ground plane of the antenna 100. In the electronic device, the grounding plane 160 may also be connected to a ground plane in the electronic device, for example, a metal layer or a metal middle frame in a PCB.

In some embodiments, a feed port 161 may be provided on the grounding plane 160. The feed port 161 is configured to feed the antenna 100. In other words, the feed element 140 may feed an electrical signal into the feed port 161. For example, the antenna 100 may further include a second feed line (not shown in the figure). One end of the second feed line may be electrically connected to the feed element 140, and the other end of the second feed line may be electrically connected to the feed port 161, so that the feed element 140 feeds the electrical signal into the feed port 161. For example, the second feed line may be a coaxial cable with impedance of 50Ω. This is not limited in this application.

The feed port 161 may further be electrically connected to the common input port 1511, to feed the common input port 1511. In some embodiments, the antenna 100 may further include a second metal blind via 181. One end of the second metal blind via 181 is electrically connected to the feed port 161, and the other end of the second metal blind via 181 is electrically connected to the common input port 1511. That is, the feed port 161 may be electrically connected to the common input port 1511 through the second metal blind via 181.

For example, the feed port 161 may be of a ring-shaped structure, and an inner diameter of the feed port 161 and an aperture of the second metal blind via 181 may be the same.

It should be understood that, for related descriptions of the first metal blind via 182 and the second metal blind via 181, refer to the related descriptions of the metal column 131. Details are not described herein again.

In some embodiments, dielectric constants of the first dielectric substrate 171, the second dielectric substrate 172, the third dielectric substrate 173, the fourth dielectric substrate 174, and the fifth dielectric substrate 175 may be 2.9.

In some embodiments, a total thickness (a dimension in the z-axis direction) of the first dielectric substrate 171, the second dielectric substrate 172, the third dielectric substrate 173, the fourth dielectric substrate 174, and the fifth dielectric substrate 175 may be less than or equal to 0.7 mm, so that the antenna 100 can have a low profile.

For example, thicknesses of the first dielectric substrate 171, the second dielectric substrate 172, the third dielectric substrate 173, the fourth dielectric substrate 174, and the fifth dielectric substrate 175 that are sequentially stacked may be 0.05 mm, 0.25 mm, 0.3 mm, 0.05 mm, and 0.05 mm respectively.

In some embodiments, the antenna 100 may further include a sixth dielectric substrate 176. The sixth dielectric substrate 176 may be located on a side that is of the first dielectric substrate 171 and that is away from the second dielectric substrate 172. A metal layer may not be disposed on an upper surface of the sixth dielectric substrate 176 (a side that is of the sixth dielectric substrate 176 and that is away from the first dielectric substrate 171) and a lower surface of the sixth dielectric substrate 176 (a side that is of the sixth dielectric substrate 176 and that faces the first dielectric substrate 171). For example, the upper surface and the lower surface of the sixth dielectric substrate 176 may not be coated with copper.

For example, a dielectric constant of the sixth dielectric substrate 176 may be 7, and a thickness (a dimension in the z-axis direction) of the sixth dielectric substrate 176 may be 0.8 mm. This is not limited in this application.

In some embodiments, the dielectric substrates may be a liquid crystal polymer (LCP), a Rogers material, or the like. This is not limited in this application. It should be understood that, when the dielectric substrates are the LCP, because a loss tangent value of the LCP may remain relatively small at a high frequency, so that the antenna 100 can have a relatively small transmission loss, to increase radiated power. This helps obtain a higher antenna gain.

Figure 9:
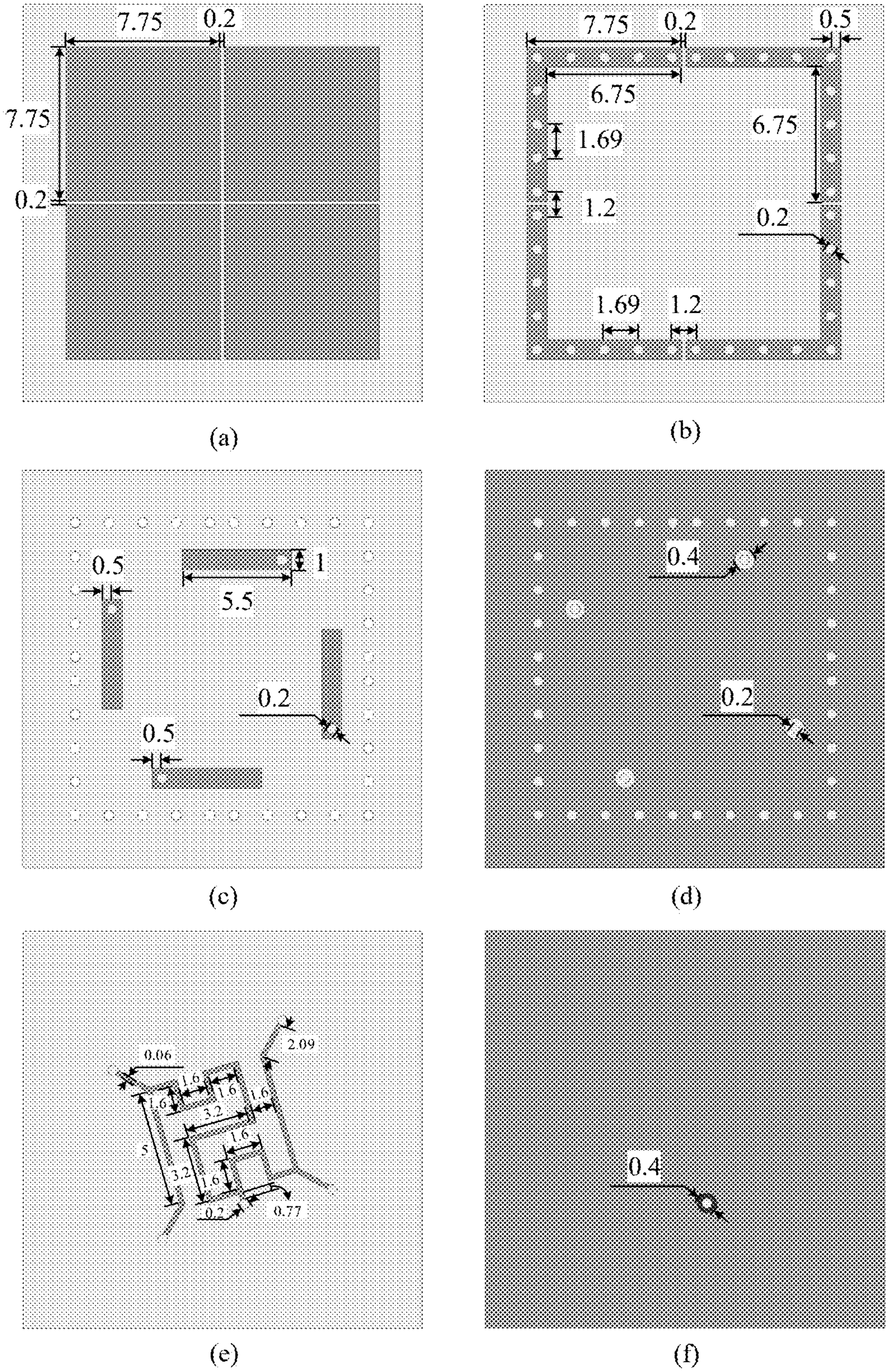
FIG. 9 is a diagram of dimensions of the antenna shown in FIG. 2 according to an embodiment of this application.

(a), (b), (c), (d), (e), and (f) in FIG. 9 are diagrams of dimensions of each structure of the radiating patch layer 110, the ring-shaped metal layer 120, the four feed probes 152, the first metal layer 130, the rotating feed network 151, and the grounding plane 160. It should be understood that the dimensions of each structure shown in FIG. 9 are merely examples, and are not intended to limit this application.

Figure 10:
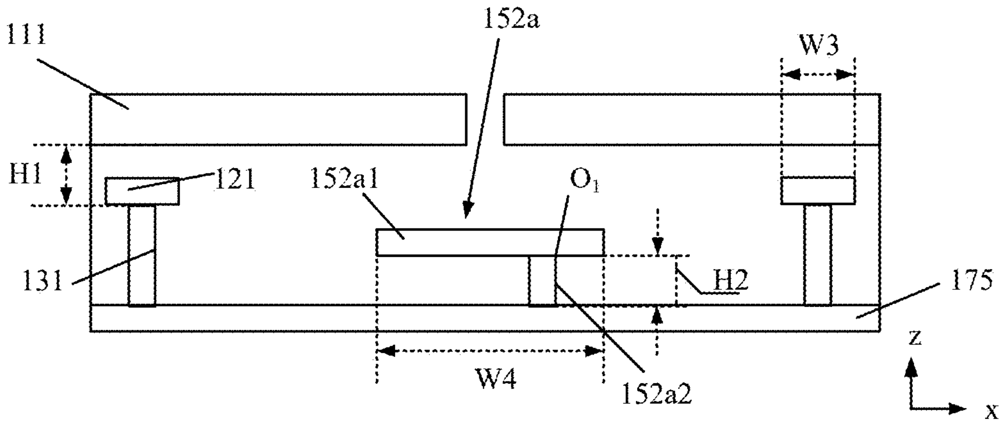
FIG. 10 is a sectional view of the antenna shown in FIG. 2 according to an embodiment of this application.

FIG. 10 is a diagram of a cross-sectional structure of the antenna 100 shown in FIG. 2.

As shown in FIG. 10, in some embodiments, the four feed probes 152 may be L-shaped feed probes. For example, the feed probe 152*a* may include a first feed stub 152*a*1 and a second feed stub 152*a*2. The first feed stub 152*a*1 may include a first connection point $O_1$. One end of the second feed stub 152*a*2 is connected to the first feed stub 152*a*1 at the first connection point $O_1$, and the other end of the second feed stub 152*a*2 may be connected to the branch output port 1512*a*. The first feed stub 152*a*1 may be coupled and connected to the radiating patch 241*a* of the antenna (as shown in FIG. 2). That is, the feed probe 152*a* is L-shaped.

It should be noted that a smaller distance between the feed probe 152*a* and the radiating patch layer 110 indicates a larger equivalent parallel capacitance value at the branch output port 1512. Matching of the antenna 100 may be adjusted by adjusting a height H2 (a dimension in the z-axis direction) of the feed probe 152*a*. Therefore, for example, the height H2 of the feed probe 152*a*, namely, a dimension of the second feed stub 152*a*2 in the z-axis direction, may be greater than or equal to 0.18 mm, and is less than or equal to 0.22 mm.

In addition, a larger overlapping area between a projection of the feed probe 152*a* in the first direction and the projection of the radiating patch layer 110 in the first direction indicates a larger equivalent parallel capacitance value at the branch output port 1512. Matching of the antenna 100 may be adjusted by adjusting a width W4 (a dimension in the z-axis direction) of the feed probe 152*a*. Therefore, for example, the width W4 of the feed probe 152*a*, namely, a dimension of the first feed stub 271*a*1 in the x-axis direction, may be greater than or equal to 8.3 mm, and is less than or equal to 9.3 mm. This is not limited in this application.

It should be further noted that a larger overlapping area between the ring-shaped metal layer 120 in the first direction (namely, the z-axis direction) and the projection of the radiating patch layer 110 in the first direction indicates a larger capacitance value of an equivalent metal fence-shaped coupling capacitive column of the metal fence structure, and is more conducive to miniaturization of the antenna 100. Therefore, the miniaturization degree of the antenna 100 may be adjusted by adjusting a dimension of the ring-shaped metal layer 120, for example, a width W3 of the L-shaped metal strip 121 shown in FIG. 10. In addition, a frequency ratio of the antenna 100 may also change by adjusting the dimension of the ring-shaped metal layer.

For example, the width of the L-shaped metal strip 121 may be greater than or equal to 1 mm, and is less than or equal to 1.5 mm. This is not limited in this application.

Besides, as shown in FIG. 10, a smaller distance H1 between the plurality of metal columns 131 and the radiating patch layer 110 indicates a larger capacitance value of the equivalent coupling capacitive column, and is more conducive to miniaturization of the antenna 100. Therefore, the miniaturization degree of the antenna 100 may be adjusted by adjusting heights (or depths, that is, dimensions in the z-axis direction) of the plurality of metal columns 131.

For example, the distance H1 between the plurality of metal columns 131 and the radiating patch layer 110 may be greater than or equal to 0.1 mm, and is less than or equal to 0.2 mm. This is not limited in this application.

In the technical solution provided in this embodiment of this application, there is a phase difference between the electrical signals on the four radiating patches 111 in the antenna 100 sequentially, to implement circular polarization with a broadside radiation characteristic. In addition, the four radiating patches distributed in a grid array are used as the radiator of the antenna 100. When the feed element 140 performs feeding, the antenna may operate in a dual band. This helps the antenna operate in an ultra-wideband UWB frequency band, for example, a Channel 5 frequency band (5990.4 MHz to 6988.8 MHz) and a Channel 9 frequency band (7499 MHz to 8486.4 MHz) of the UWB. Besides, a range of an operating frequency band of the antenna 100 can be adjusted by adjusting a width of a slot between the radiating patches 111. This helps further expand a bandwidth of the antenna 100.

Figure 11:
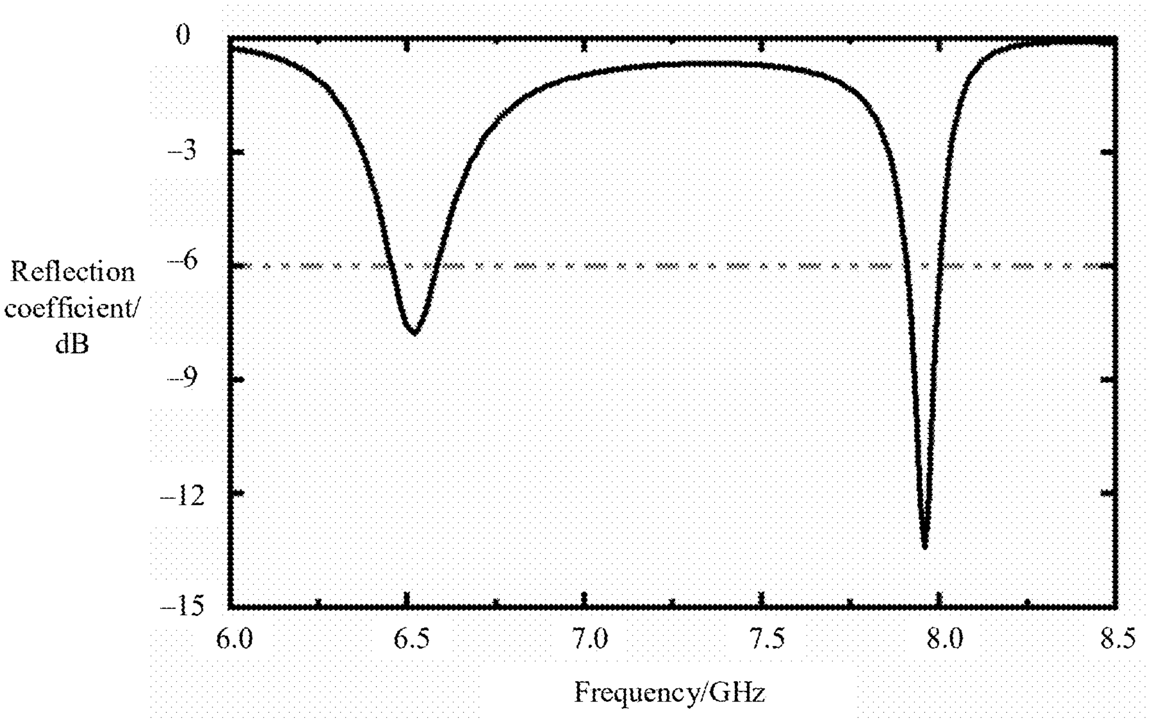
FIG. 11 is a diagram of a simulation result of a reflection coefficient of the antenna shown in FIG. 2.
Figure 12:
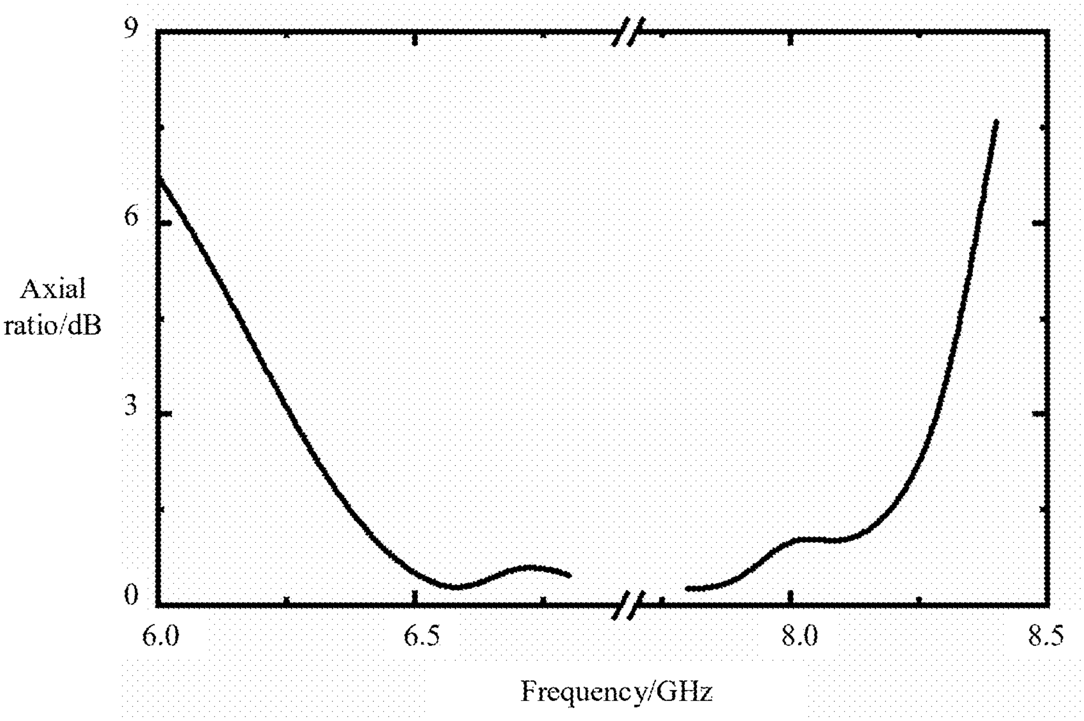
FIG. 12 is a diagram of a simulation result of an axial ratio of the antenna shown in FIG. 2.
Figure 13:
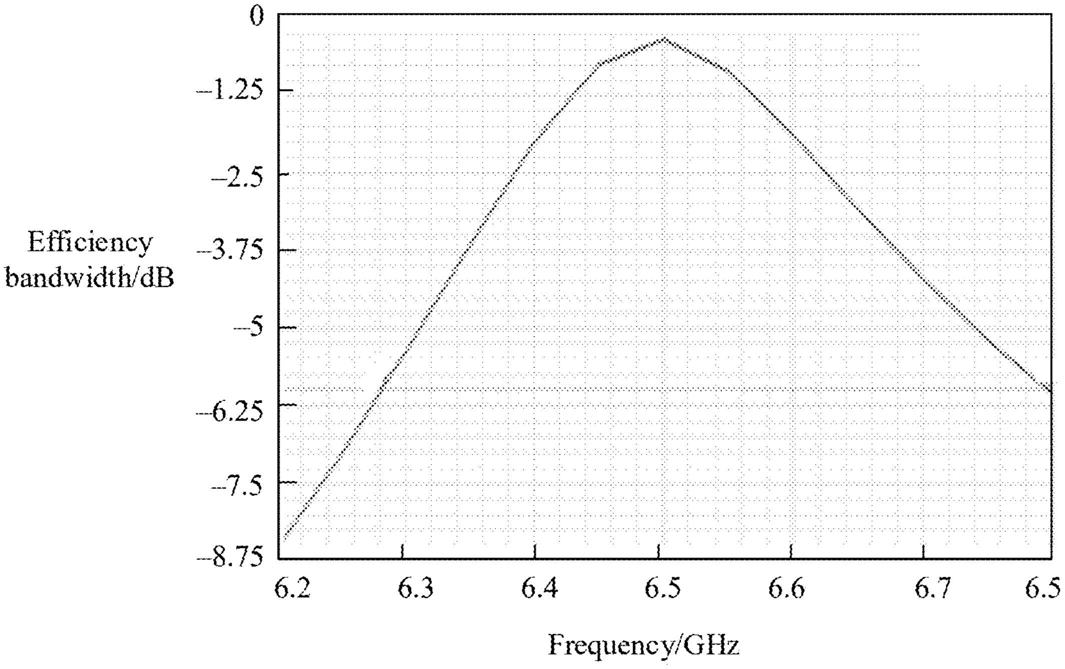
FIG. 13 is a diagram of an example of a simulation result of an efficiency bandwidth of the antenna shown in FIG. 2.
Figure 14:
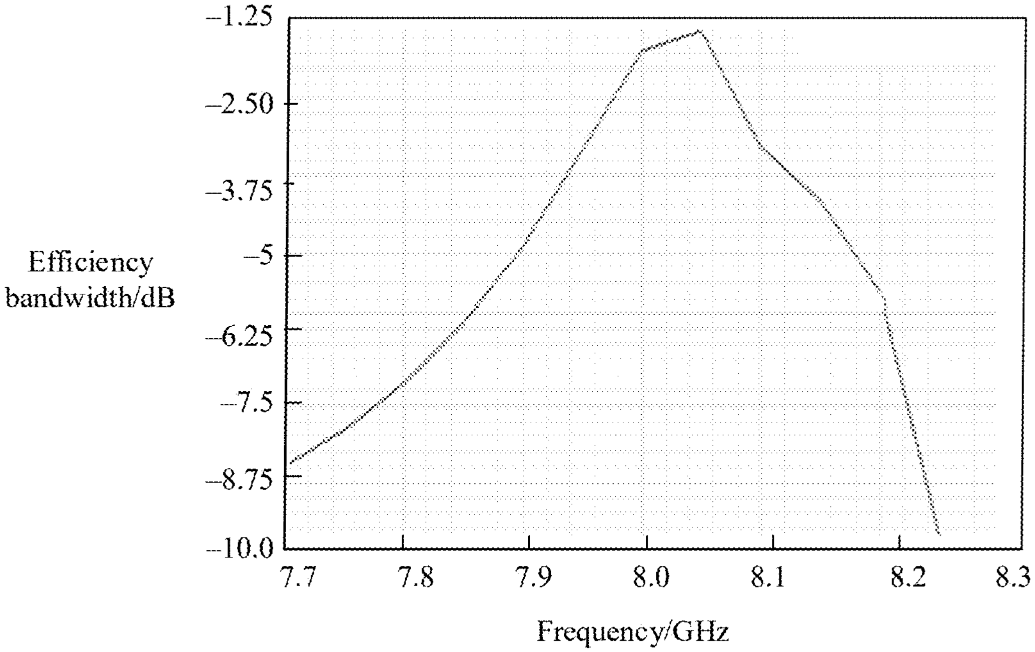
FIG. 14 is a diagram of another example of a simulation result of an efficiency bandwidth of the antenna shown in FIG. 2.
Figure 15:
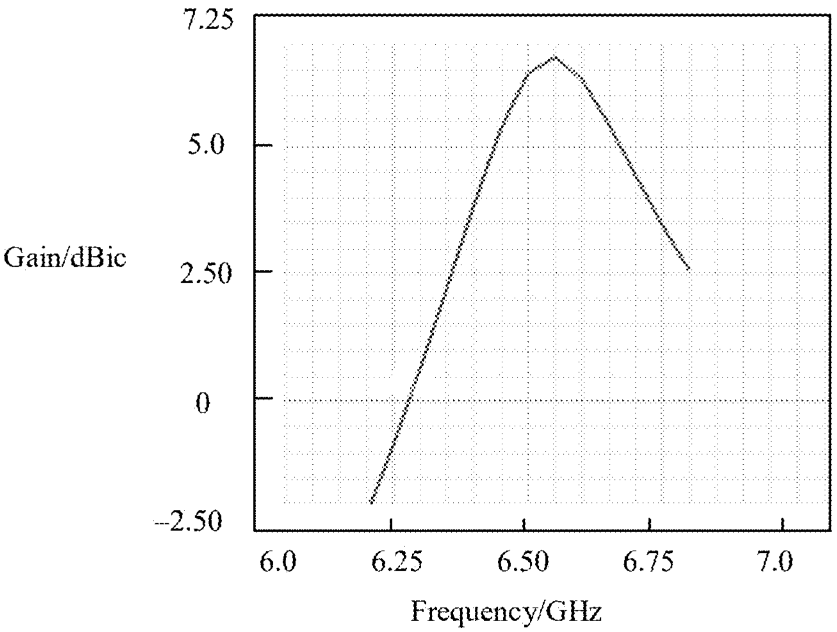
FIG. 15 is a diagram of an example of a simulation result of a circular polarization gain of the antenna shown in FIG. 2.
Figure 16:
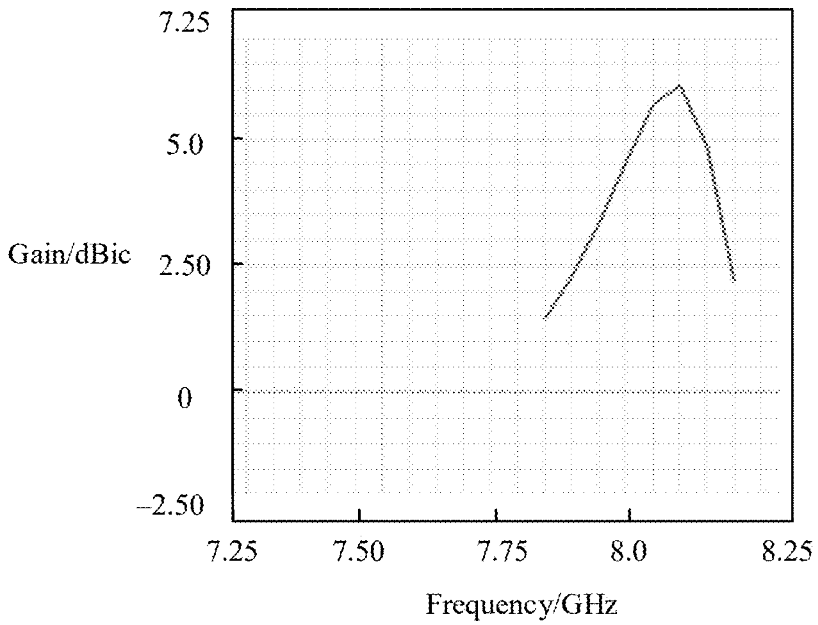
FIG. 16 is a diagram of another example of a simulation result of a circular polarization gain of the antenna shown in FIG. 2.

FIG. 11 to FIG. 16 are diagrams of simulation results of the antenna shown in FIG. 2. FIG. 11 is a diagram of a simulation result of a reflection coefficient of the antenna shown in FIG. 2. FIG. 12 is a diagram of a simulation result of an axial ratio of the antenna shown in FIG. 2. FIG. 13 and FIG. 14 are diagrams of simulation results of efficiency bandwidths of the antenna shown in FIG. 2. FIG. 15 and FIG. 16 are diagrams of simulation results of circular polarization gains of the antenna shown in FIG. 2.

As shown in FIG. 11, the antenna has two operating frequency bands. The two operating frequency bands can cover dual bands, Channel 5 and Channel 9, in the UWB frequency band, and center frequencies are 6.5 GHz and 8 GHz, which can meet a communication requirement. In addition, the antenna implements a wide impedance bandwidth. With the reflection coefficient less than −6 dB as a limit, the impedance bandwidth of the antenna is 6.46 GHz to 6.59 GHz and 7.91 GHz to 8.00 GHz.

As shown in FIG. 12, axial ratios of the antenna in two frequency bands near 6.5 GHz and 8.0 GHz are basically less than 3 dB. The antenna has a good circular polarization radiation characteristic in the two frequency bands, Channel 5 and Channel 9, in the UWB frequency band, which can meet the communication requirement.

With reference to FIG. 13 and FIG. 14, the antenna has a wide efficiency bandwidth. With the efficiency bandwidth less than −6 dB as a limit, the efficiency bandwidth of the antenna is 6.28 GHz to 6.80 GHz and 7.86 GHz to 8.20 GHz.

With reference to FIG. 15 and FIG. 16, a gain of the antenna in a frequency band of 6.31 GHz to 6.80 GHz is greater than 1 dBic, and a gain of the antenna in a frequency band of 7.84 GHz to 8.20 GHz is greater than 0 dBic. Therefore, the antenna has a stable gain, and can meet the communication requirement.

Figure 17:
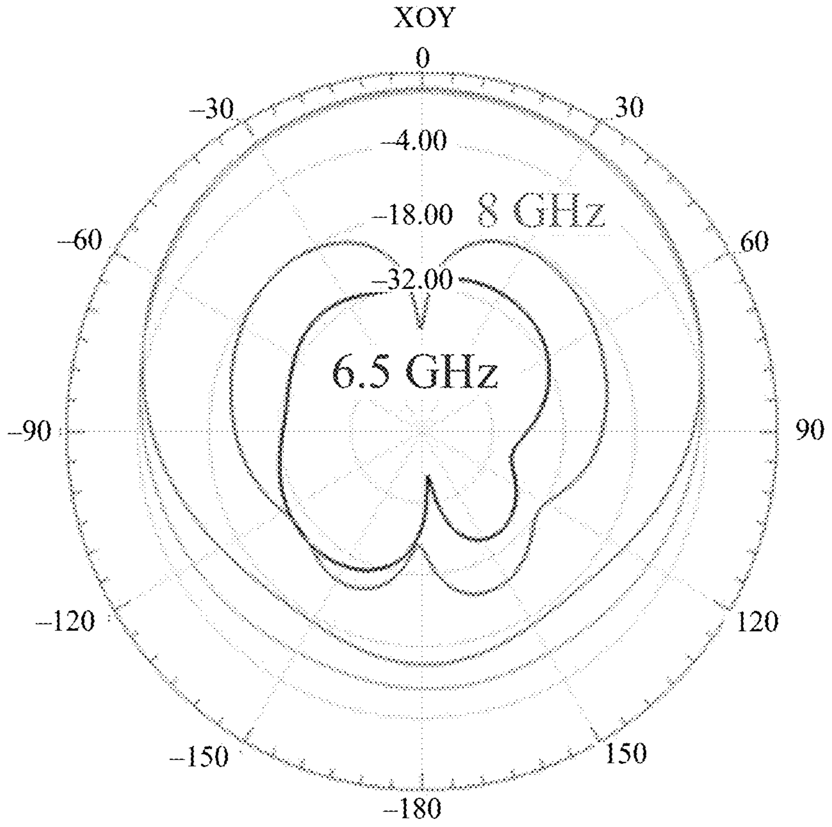
FIG. 17 is a radiation pattern of the antenna shown in FIG. 2 on an xoy plane at 6.5 GHz and 8 GHz.
Figure 18:
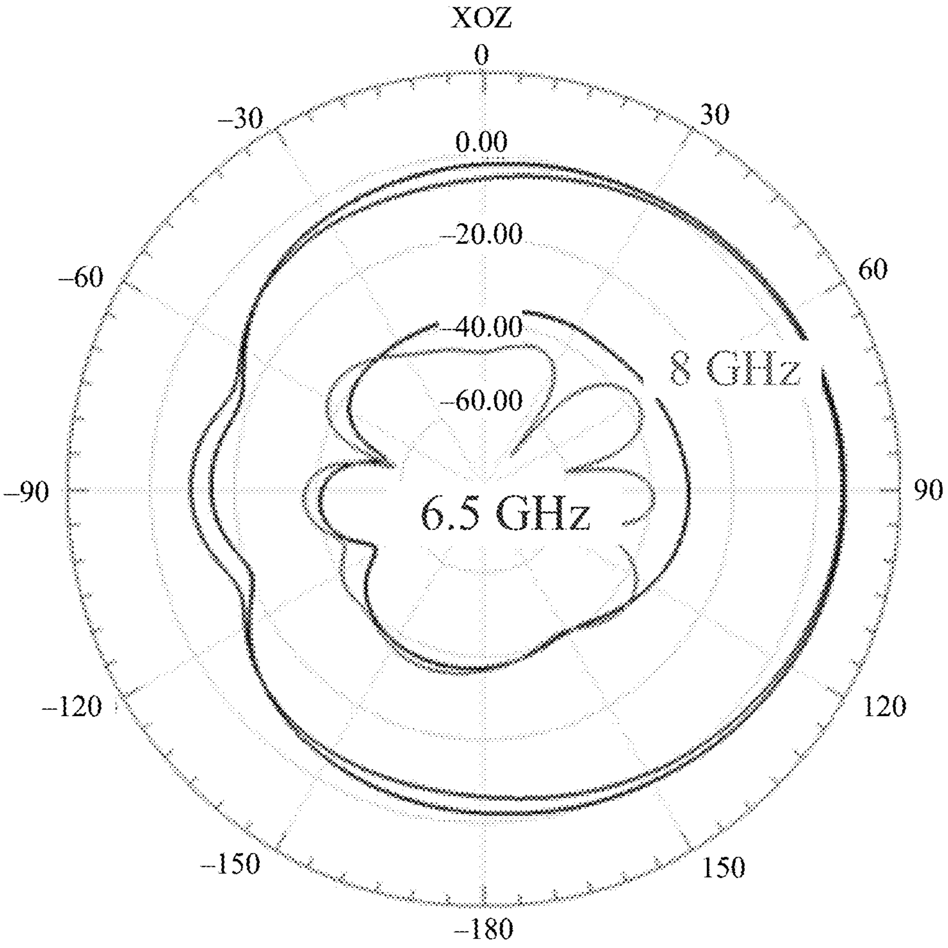
FIG. 18 is a radiation pattern of the antenna shown in FIG. 2 on a yoz plane at 6.5 GHz and 8 GHz.

FIG. 17 is a radiation pattern of the antenna shown in FIG. 2 on an xoy plane at 6.5 GHz and 8 GHz. FIG. 18 is a radiation pattern of the antenna shown in FIG. 2 on a yoz plane at 6.5 GHz and 8 GHz.

With reference to FIG. 17 and FIG. 18, at 6.5 GHz, a beam coverage angle of the antenna on an xoy plane is ±40°, and a beam coverage angle of the antenna on an xoz plane is ±39°. At 8.0 GHz, the beam coverage angle of the antenna on the xoy plane is ±37°, and the beam coverage angle of the antenna on the xoz plane is ±38°. In addition, in 6.5 GHz and 8.0 GHz, cross polarization of the antenna is less than −15 dB. The antenna has low cross polarization, and can meet the communication requirement.

Figure 19:
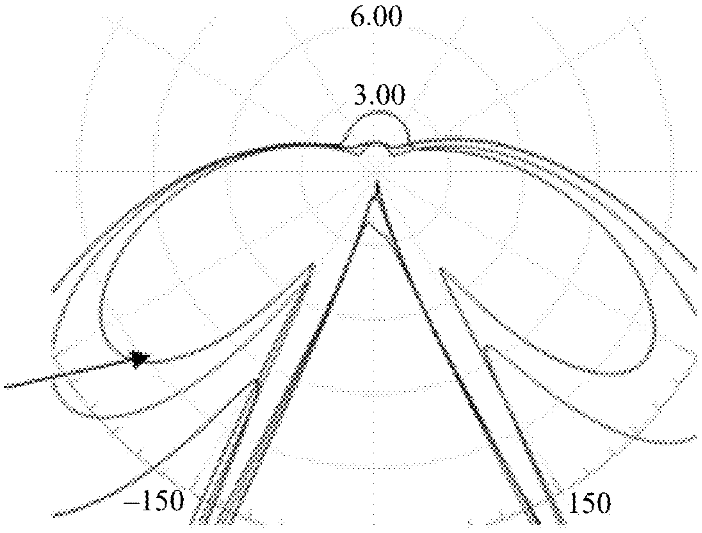
FIG. 19 is an axial ratio pattern of the antenna shown in FIG. 2 on an xoy plane at 6.3 GHz, 6.5 GHz, 6.7 GHz, 7.9 GHz, 8.0 GHz, and 8.2 GHz.
Figure 20:
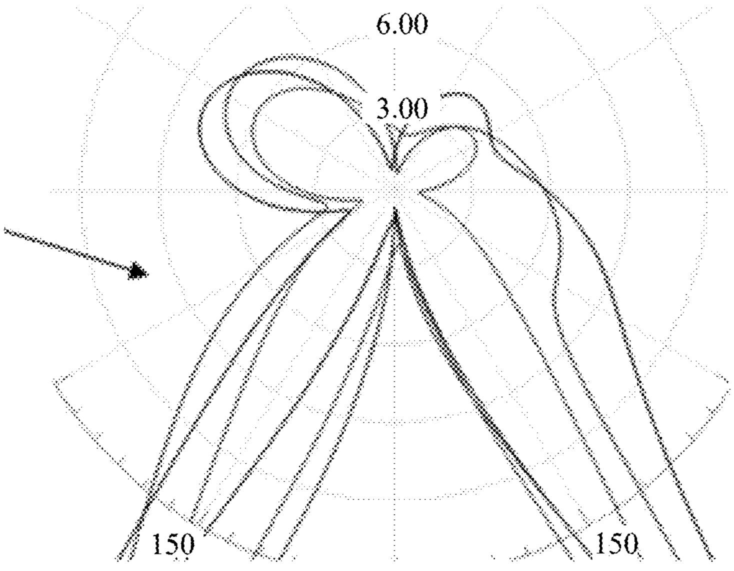
FIG. 20 is an axial ratio pattern of the antenna shown in FIG. 2 on a yoz plane at 6.3 GHz, 6.5 GHz, 6.7 GHz, 7.9 GHz, 8.0 GHz, and 8.2 GHz.

FIG. 19 is an axial ratio pattern of the antenna shown in FIG. 2 on the xoy plane at 6.3 GHz, 6.5 GHz, 6.7 GHz, 7.9 GHz, 8.0 GHz, and 8.2 GHz. FIG. 20 is an axial ratio pattern of the antenna shown in FIG. 2 on a yoz plane at 6.3 GHz, 6.5 GHz, 6.7 GHz, 7.9 GHz, 8.0 GHz, and 8.2 GHz.

With reference to FIG. 19 and FIG. 20, the antenna implements wide axial ratio angles at 6.3 GHz, 6.5 GHz, 6.7 GHz, 7.9 GHz, 8.0 GHz, and 8.2 GHz. Axial ratio angles of the antenna on the xoy plane and the xoz plane corresponding to the foregoing frequencies are shown in Table 1.

TABLE 1

| | xoy plane | xoz plane |
|---|---|---|
| 6.3 GHz | ±50° | ±60° |
| 6.5 GHz | ±65° | ±80° |
| 6.7 GHz | ±60° | ±70° |
| 7.9 GHz | ±40° | ±35° |
| 8.0 GHz | ±60° | ±40° |
| 8.2 GHz | ±50° | ±35° |

Figure 21:
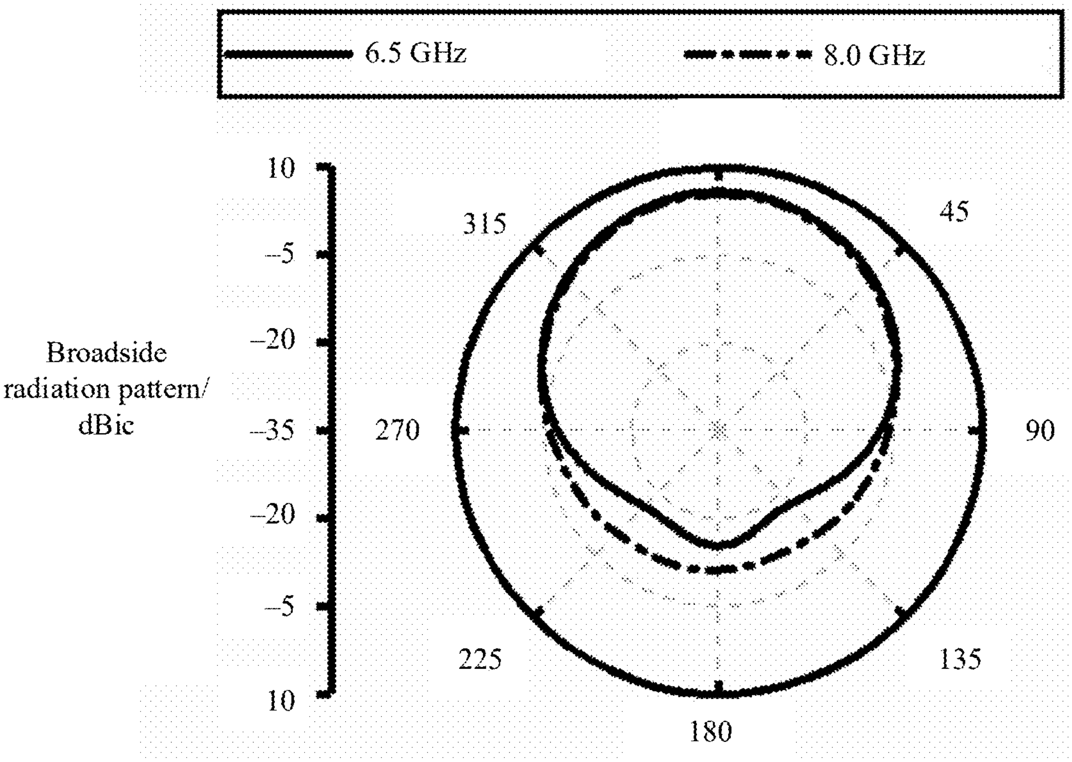
FIG. 21 is a radiation pattern of the antenna shown in FIG. 2 at 6.5 GHz and 8.0 GHz.

FIG. 21 is a radiation pattern of the antenna shown in FIG. 2 at 6.5 GHz and 8.0 GHz. As shown in FIG. 21, at 6.5 GHz and 8.0 GHz, the antenna implements a circular polarization gain greater than 1 dBic, and a maximum gain occurs at an angle of 0°. The antenna has the broadside radiation characteristic, and can meet the communication requirement.

Figure 22:
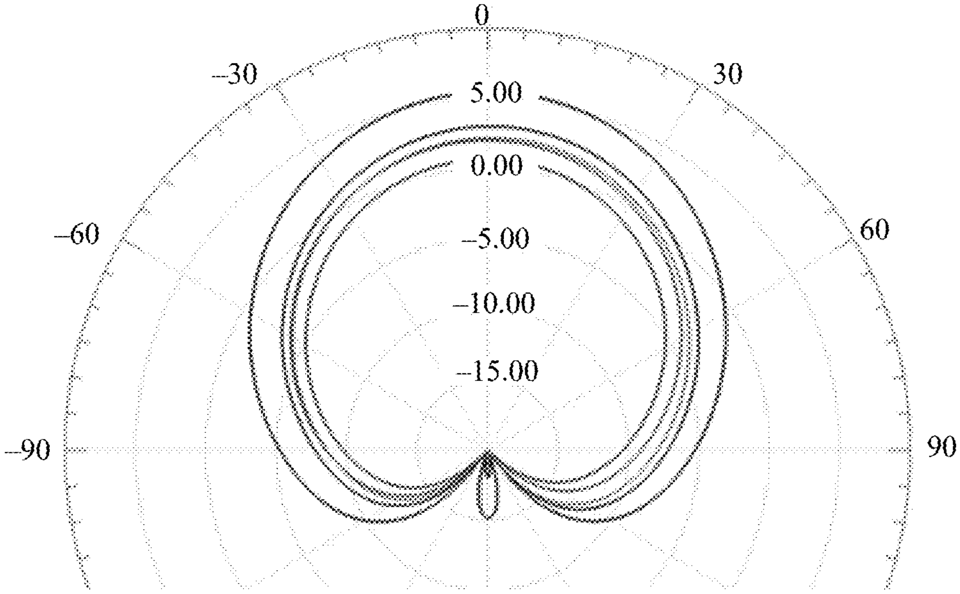
FIG. 22 is a radiation pattern of the antenna shown in FIG. 2 at 7.9 GHz, 8.0 GHz, and 8.2 GHz.

FIG. 22 is a radiation pattern of the antenna shown in FIG. 2 at 7.9 GHz, 8.0 GHz, and 8.2 GHz. As shown in FIG. 22, at 6.3 GHz, 6.5 GHz, and 6.7 GHz, a beam coverage angle of the antenna in the radiation pattern may be ±39°. The antenna has a wide beam coverage angle, and can meet the communication requirement.

Figure 23:
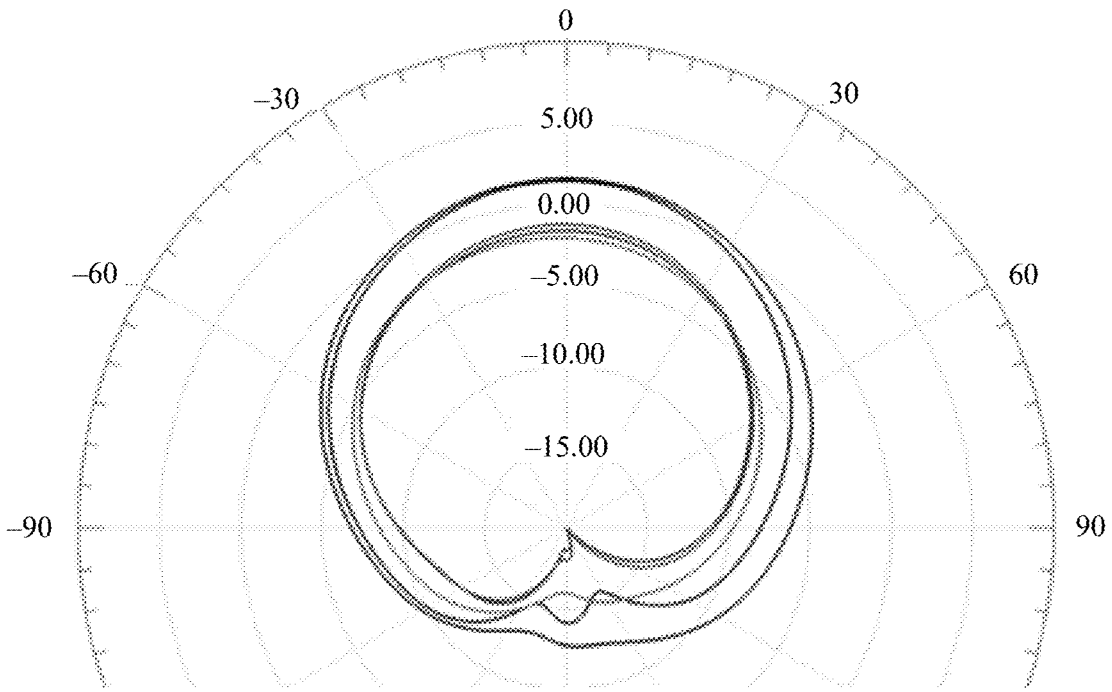
FIG. 23 is a radiation pattern of the antenna shown in FIG. 2 at 6.3 GHz, 6.5 GHz, and 6.7 GHz.

FIG. 23 is a radiation pattern of the antenna shown in FIG. 2 at 6.3 GHz, 6.5 GHz, and 6.7 GHz. As shown in FIG. 23, at 7.9 GHz, 8.0 GHz, and 8.2 GHz, a beam coverage angle of the antenna in the radiation pattern may be ±39°. The antenna has a wide beam coverage angle, and can meet the communication requirement.

Figure 24:
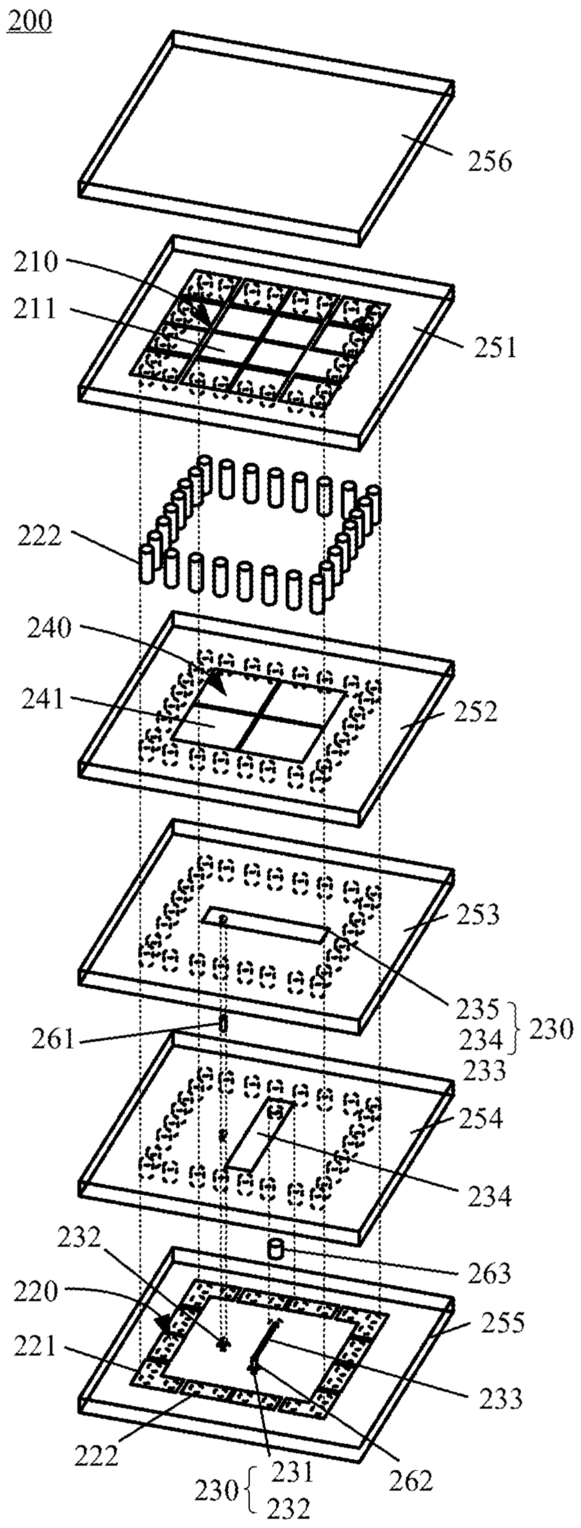
FIG. 24 is a diagram of a structure of another antenna according to an embodiment of this application.
Figure 25:
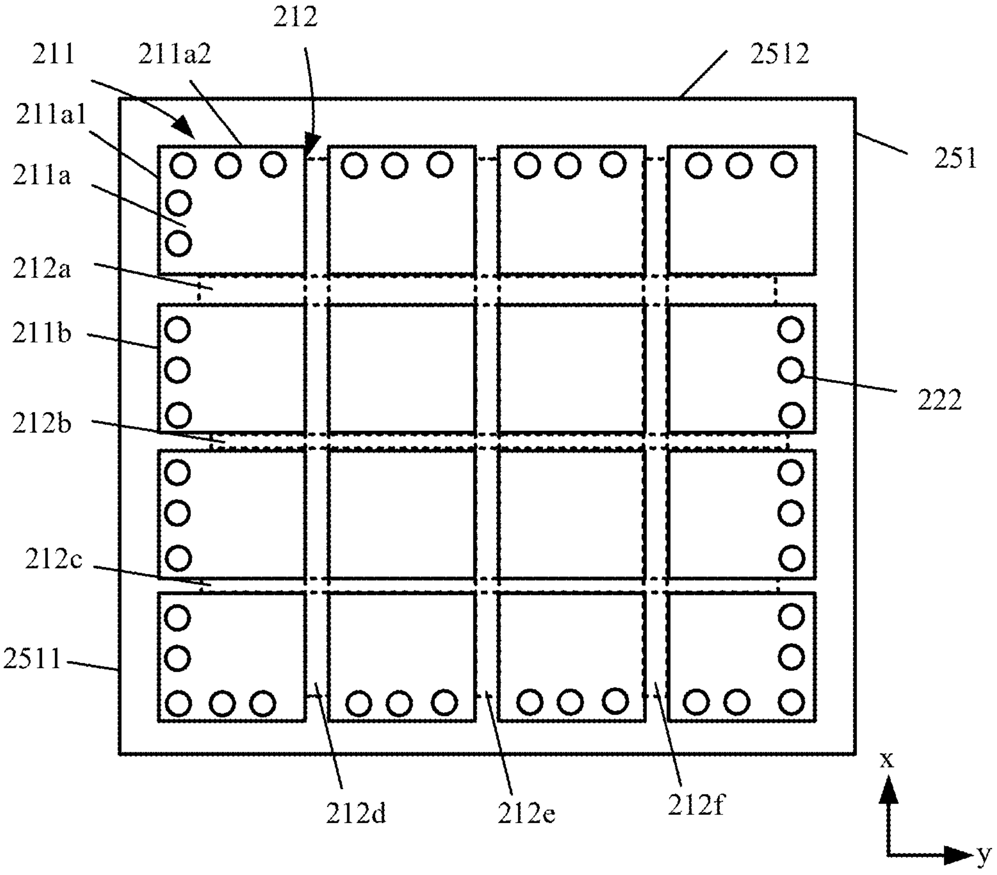
FIG. 25 is a top view of a radiating patch layer according to an embodiment of this application.
Figure 26:
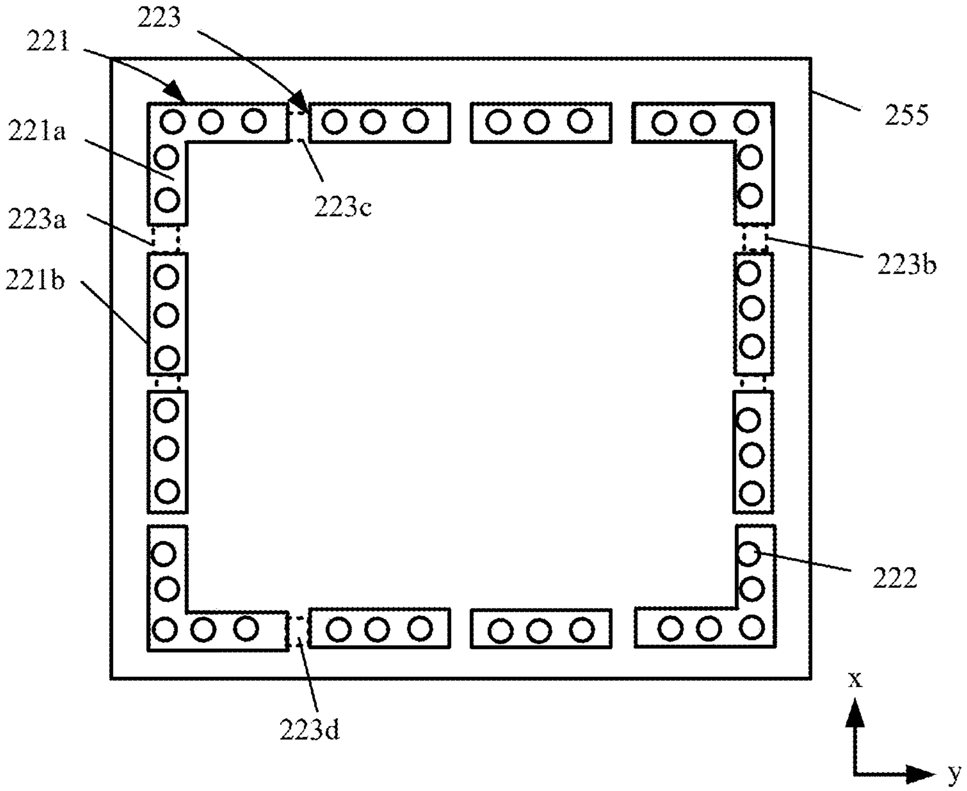
FIG. 26 is a top view of a ring-shaped metal layer according to an embodiment of this application.

FIG. 24 to FIG. 26 are diagrams of another structure of an antenna 200 according to an embodiment of this application. FIG. 24 is an exploded diagram of the antenna 200 according to an embodiment of this application. FIG. 25 is a schematic top view of a radiating patch layer 210 shown in FIG. 24. FIG. 26 is a schematic top view of a ring-shaped metal layer 220 shown in FIG. 24. The antenna 200 may be used in the electronic device 10 shown in FIG. 1.

As shown in FIG. 24, the antenna 200 may include the radiating patch layer 210, the ring-shaped metal layer 220, and a feed structure 230. The feed structure 230 may be located between the radiating patch layer 210 and the ring-shaped metal layer 220.

With reference to FIG. 24 and FIG. 25, the radiating patch layer 210 may include sixteen radiating patches 211. The sixteen radiating patches 211 may be distributed in a 4×4 array.

In some embodiments, there is a slot between two adjacent radiating patches 211 in a row direction and a column direction of the array. For example, as shown in FIG. 25, six first slots 212 may be formed between the sixteen antenna radiating patches 211. Widths (dimensions in an x-axis direction or dimensions in a y-axis direction) of any two of the six first slots 212 may be the same or may be different. This is not limited in this application.

In some embodiments, the width of the first slot 212 may be greater than or equal to 0.1 mm, and is less than or equal to 0.6 mm. For example, as shown in FIG. 25, the six first slots 212 may include first slots 212*a*, 212*b*, 212*c*, 212*d*, 212*e* and 212*f*. Widths (dimensions in the x-axis direction) of the first slots 212*a* and 212*c* may be 0.4 mm, a width (a dimension in the x-axis direction) of the first slot 212*b* may be 0.2 mm, widths (dimensions in the y-axis direction) of the first slots 212*d* and 212*f* may be 0.4 mm, and a width (a dimension in the y-axis direction) of the first slot 212*e* may be 0.2 mm.

It should be understood that a specific value of the width of the first slot 212 is merely an example, and may be adjusted based on actual production or design. This is not limited in this application.

In some embodiments, the radiating patch 211 may be but is not limited to a circular metal patch or a square metal patch.

For example, as shown in FIG. 25, the radiating patch 211 may be the square metal patch, and horizontal dimensions of the radiating patch 211 may be 3.85 mm×3.85 mm. This is not limited in this application.

For example, horizontal dimensions of the radiating patch layer 210 may be 16.4 mm×16.4 mm. This is not limited in this application.

It should be understood that the horizontal dimensions of the radiating patch 211 and the horizontal dimensions of the radiating patch layer 210 are merely examples, and may be adjusted based on actual production and design. This is not limited in this application.

In some embodiments, as shown in FIG. 25, the antenna 200 may further include a first dielectric substrate 251. The first dielectric substrate 251 may be disposed between the radiating patch layer 210 and the ring-shaped metal layer 220, and is configured to support the radiating patch layer 210. For example, the radiating patch layer 210 may be disposed on an upper surface of the first dielectric substrate 251 (a side that is of the first dielectric substrate 251 and that is away from the ring-shaped metal layer 220).

In some embodiments, edges of the sixteen radiating patches 211 may be parallel to edges of the first dielectric substrate 251. For example, as shown in FIG. 26, a first edge 211*a*1 of the radiating patch 211 may be parallel to a first edge 2511 of the first dielectric substrate 251, and a second edge 211*a*2 of the radiating patch 211 may be parallel to a second edge 2512 of the first dielectric substrate 251.

In some embodiments, the radiating patch layer 210 may be formed by etching the first dielectric substrate 251.

With reference to FIG. 24 and FIG. 26, the ring-shaped metal layer 220 may be disposed in correspondence with a peripheral edge part of the radiating patch layer 210. In other words, a projection of the ring-shaped metal layer 220 in a first direction and a projection of the peripheral edge part of the radiating patch layer 210 in the first direction overlap. The first direction may be a direction perpendicular to the radiating patch layer 210, that is, an x-axis direction shown in FIG. 24.

Specifically, the ring-shaped metal layer 220 may include twelve metal strips 221. The twelve metal strips 221 may form a quadrilateral, and an edge of the quadrilateral may be disposed in correspondence with an edge of the radiating patch layer 210.

For example, as shown in FIG. 26, the twelve metal strips 221 may include metal strips 221*a* and 221*b*. As shown in FIG. 24, the metal strips 221*a* and 221*b* may be disposed in correspondence with radiating patches 211*a* and 211*b*. In other words, projections of the metal strips 221*a* and 221*b* in the first direction (namely, a z-axis direction) and projections of edge parts of the radiating patches 211*a* and 211*b* in the first direction (namely, the z-axis direction) may overlap respectively.

In addition, a plurality of second slots 223 provided in correspondence with the six first slots 212 may be formed between the twelve metal strips 221. For example, as shown in FIG. 26, the second slots 223 may include second slots 223*a*, 223*b*, 223*c*, and 223*d*. The second slots 223*a* and 223*b* may be provided in correspondence with the first slot 212*a*, and the second slots 223*c* and 223*d* may be provided in correspondence with the first slot 212*d*.

A plurality of metal columns 222 may be disposed on the ring-shaped metal layer 220. Each of the plurality of metal columns 222 may be electrically connected to the radiating patch layer 210. In other words, the ring-shaped metal layer 220 may be electrically connected to the radiating patch layer 210 through the plurality of metal columns 222.

For related descriptions of the plurality of metal columns 222, refer to the related descriptions of the metal column 131 in the embodiment shown in FIG. 2. Details are not described herein again.

In the technical solutions provided in this application, the ring-shaped metal layer 220 and the plurality of metal columns 222 jointly form a metal fence structure, which is equivalent to a fence-shaped coupling capacitive column. In this way, an operating area of a radiator of the antenna 200 can be expanded, so that the antenna 200 can have a low profile without affecting an operating mode of the radiating patch layer 210. This helps implement miniaturization of the antenna 200.

It should be understood that, to meet different requirements of actual production and design, a miniaturization degree of the antenna 200 may be adjusted by adjusting dimensions of the structure of the ring-shaped metal layer 220 and a quantity, locations, and heights of the plurality of metal columns 222.

It should be understood that, for specific descriptions of adjusting the miniaturization degree of the antenna 200, refer to the embodiment shown in FIG. 2. Details are not described herein again.

In some embodiments, as shown in FIG. 24, the antenna 200 may further include a fifth dielectric substrate 255. The fifth dielectric substrate 255 may be disposed on a side that is of the ring-shaped metal layer 220 and that is away from the radiating patch layer 210, and is configured to support the ring-shaped metal layer 220. In other words, the ring-shaped metal layer 220 may be disposed on an upper surface of the fifth dielectric substrate 255.

As shown in FIG. 24, the feed structure 230 may include a first feed port 231 and a second feed port 232. The first feed port 231 and the second feed port 232 may be electrically connected to the radiating patch layer 210, and are configured to feed the antenna 200.

When the first feed port 231 performs feeding, an electrical signal on the radiating patch layer 210 is a first electrical signal. When the second feed port 232 performs feeding, an electrical signal on the radiating patch layer 210 is a second electrical signal. Amplitudes of the first electrical signal and the second electrical signal are equal, and a phase difference is 180°±45°. In other words, differential feeding is performed at the first feed port 231 and the second feed port 232, to implement circular polarization, so that the antenna 200 can generate a broadside radiation pattern in which polarization is circular polarization.

In some embodiments, the first feed port 231 and the second feed port 232 may be disposed on the fifth dielectric substrate 255.

In some embodiments, the feed structure 230 may include a first feed line 233, a second feed line 234, and a third feed line 235. The first feed line 233 and the second feed line 234 may be parallel to each other, and the second feed line 234 and the third feed line 235 may be perpendicular to each other. For example, the first feed line 233, the second feed line 234, and the third feed line 235 may be but are not limited to a probe, a strip line, or a microstrip line. In this application, an example in which the first feed line 233 is a microstrip line, and the second feed line 234 and the third feed line 235 are probes is used for description.

A first end of the first feed line 233 may be electrically connected to the second feed line 234, and the second feed line 234 may be electrically connected to the radiating patch layer 210, to feed the radiating patch layer 210. The third feed line 235 may be electrically connected to the radiating patch layer 210, to implement electrical connection to the radiating patch layer 210. A second end of the first feed line 233 may include the first feed port 231, and the third feed line 235 may include the second feed port 232, to feed the first feed line 233 and the third feed line 235.

It should be understood that, compared with a feed stub of the third feed line 235, a feed stub of the second feed line 234 includes the first feed line 233 added as a transmission line, so that when the first feed port 231 and the second feed port 232 perform feeding at the same time, the amplitudes of the first electrical signal and the second electrical signal on the radiating patch layer 210 are equal, and the phase difference is 180°±45°. In other words, differential feeding is performed, so that the antenna 200 can generate the broadside radiation pattern in which polarization is circular polarization.

In some embodiments, a length of the first feed line 233 may be equal to a half of a first wavelength.

It should be understood that the first wavelength may be a wavelength corresponding to an operating frequency band of the antenna 200. The wavelength corresponding to the operating frequency band of the antenna 200 may be understood as a wavelength corresponding to a center frequency of the operating frequency band of the antenna 200, or may be understood as a wavelength corresponding to a resonance frequency of the antenna 200.

In some embodiments, as shown in FIG. 24, for avoidance design, the first feed line 233, the second feed line 234, and the third feed line 235 may be sequentially spaced from each other in a direction from the ring-shaped metal layer 220 to the radiating patch layer 210, to ensure that the first feed line 233, the second feed line 234, and the third feed line 235 operate normally.

In some embodiments, as shown in FIG. 24, the antenna 200 may further include a third dielectric substrate 253 and a fourth dielectric substrate 254 that are stacked. The third dielectric substrate 253 and the fourth dielectric substrate 254 may be between the radiating patch layer 210 and the first feed line 233, and are configured to support the second feed line 234 and the third feed line 235 respectively. In other words, the second feed line 234 may be disposed on an upper surface of the fourth dielectric substrate 254 (a side that is of the fourth dielectric substrate 254 and that is away from the first feed line 233), and the third feed line 235 may be disposed on an upper surface of the third dielectric substrate 253 (a side that is of the third dielectric substrate 253 and that is away from the first feed line 233).

In some embodiments, when the first feed port 231 is provided on the fifth dielectric substrate 255, the antenna 200 may further include a first metal blind via 262 and a metal buried via 263. One end of the first metal blind via 262 may be electrically connected to the first feed port 231, and the other end of the first metal blind via 262 may be electrically connected to the first end of the first feed line 233. That is, the first feed port 231 is electrically connected to the first feed line 233 through the first metal blind via 262. One end of the metal buried via 263 may be electrically connected to the second end of the first feed line 233, and the other end of the metal buried via 263 may be electrically connected to the second feed line 234. That is, the first feed line 233 is electrically connected to the second feed line 234 through the metal buried via 263. For example, when the second feed line 234 is a probe, a position at which the second feed line 234 is electrically connected to the metal buried via 263 may be close to an end part of the second feed line 234.

In some embodiments, when the second feed port 232 is provided on the fifth dielectric substrate 255, the antenna 200 may further include a second metal blind via 261. One end of the second metal blind via 261 may be electrically connected to the second feed port 232, and the other end of the second metal blind via 261 may be electrically connected to the third feed line 235. That is, the second feed port 232 is electrically connected to the third feed line 235 through the second metal blind via 261. For example, when the third feed line 235 is a probe, a position at which the third feed line 235 is electrically connected to the second metal blind via 261 may be close to an end part of the third feed line 235.

For descriptions of the foregoing metal blind via, refer to the related descriptions of the metal blind via in the embodiment shown in FIG. 2. To avoid repetition, details are not described herein again.

In some embodiments, the antenna 200 may further include a grounding plane (not shown in the figure). The grounding plane may be located on the side that is of the ring-shaped metal layer 220 and that is away from the radiating patch layer 210, and the grounding plane may be used as a ground plane of the antenna 200. For example, the grounding plane may be disposed on a lower surface of the fifth dielectric substrate 255.

In some embodiments, the grounding plane may include the first feed port 231 and the second feed port 232. In other words, the first feed port 231 and the second feed port 232 may penetrate through the grounding plane.

In some embodiments, the antenna 200 may further include a first feed element and a second feed element. The first feed element and the second feed element may be electrically connected to the first feed port 231 and the second feed port 232 respectively, to feed the antenna 200.

In some embodiments, as shown in FIG. 24, the antenna 200 may further include a matching patch layer 240 disposed between the radiating patch layer 210 and the feed structure 230. For example, the matching patch layer 240 may be located between the radiating patch layer 210 and the third feed line 235, is coupled and connected to the radiating patch layer 210, and is electrically connected to the second feed line 234 and the third feed line 235.

The matching patch layer 240 may include four metal patches 241, which are distributed in a 2×2 array. The matching metal layer 240 may be configured to tune impedance of the antenna 200, to implement impedance matching.

For example, the plurality of metal columns 222 may be located on an outer periphery of the matching patch layer 240. In other words, a projection of the matching patch layer 240 in the first direction (namely, the z-axis direction) and projections of the plurality of metal columns 222 in the first direction do not overlap.

In some embodiments, the antenna 200 may further include a second dielectric substrate 252. The second dielectric substrate 252 may be located between the matching patch layer 240 and the third feed line 235, and is configured to support the matching patch layer 240. In other words, the matching patch layer 240 may be disposed on an upper surface of the second dielectric substrate 252 (a side that is of the second dielectric substrate 252 and that is away from the ring-shaped metal layer 220).

For example, dielectric constants of the first dielectric substrate 251, the second dielectric substrate 252, the third dielectric substrate 253, the fourth dielectric substrate 254, and the fifth dielectric substrate 255 are 2.9.

In some embodiments, the antenna 200 may further include a sixth dielectric substrate 256. The sixth dielectric substrate 256 may be located on a side that is of the first dielectric substrate 251 and that is away from the second dielectric substrate 252. A metal layer may not be disposed on an upper surface of the sixth dielectric substrate 256 (a side that is of the sixth dielectric substrate 256 and that is away from the first dielectric substrate 251). For example, the upper surface of the sixth dielectric substrate 256 may not be coated with copper.

For example, a dielectric constant of the sixth dielectric substrate 256 may be 7.

For related descriptions of the foregoing dielectric substrates, refer to the embodiment shown in FIG. 2. Details are not described herein again.

Figure 27:
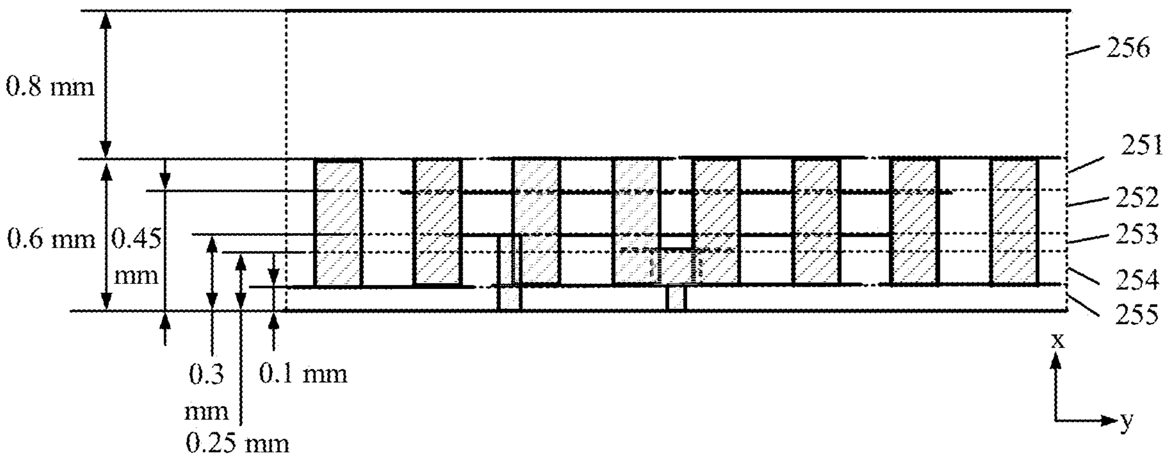
FIG. 27 is a diagram of dimensions of the antenna shown in FIG. 24 according to an embodiment of this application.

FIG. 27 is a diagram of cross-sectional dimensions of the antenna 200 shown in FIG. 24.

As shown in FIG. 27, for example, thicknesses of the first dielectric substrate 251, the second dielectric substrate 252, the third dielectric substrate 253, the fourth dielectric substrate 254, the fifth dielectric substrate 255, and the sixth dielectric substrate 256 may be 0.15 mm, 0.15 mm, 0.05 mm, 0.15 mm, 0.1 mm, and 0.8 mm respectively.

Figure 28:
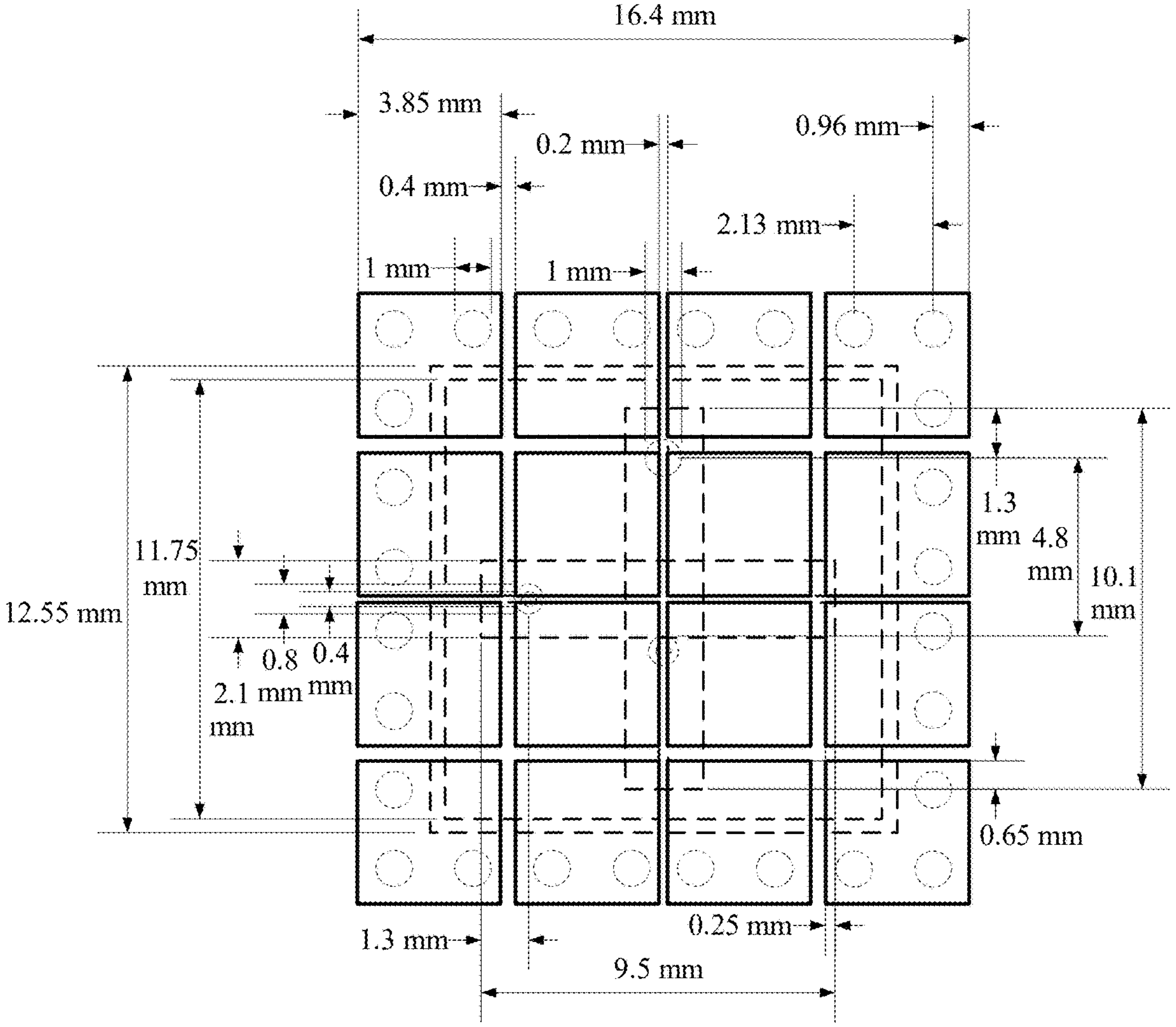
FIG. 28 is a diagram of dimensions of the antenna shown in FIG. 24 according to an embodiment of this application.

FIG. 28 is a diagram of dimensions of each structure of the antenna 200. It should be understood that the dimensions of each structure shown in FIG. 28 are merely examples, and are not intended to limit this application.

It should be understood that, for a part that is not described in detail and that is of each structure in the embodiment shown in FIG. 24, refer to the embodiment shown in FIG. 2. Details are not described herein again.

In the technical solution provided in this embodiment of this application, feeding is performed through the first feed port 231 and the second feed port 232, so that there is the phase difference between the electrical signals on the radiating patch layer 210 of the antenna 200. In other words, differential feeding is implemented on the antenna 200, to implement circular polarization with a broadside radiation characteristic. In addition, the sixteen radiating patches 211 distributed in a grid array are used as the radiator of the antenna 200. When feeding is performed through the first feed port 231 and the second feed port 232, the antenna 200 may operate in a dual band. This helps the antenna operate in an ultra-wideband UWB frequency band, for example, a Channel 5 frequency band (5990.4 MHz to 6988.8 MHz) and a Channel 9 frequency band (7499 MHz to 8486.4 MHz) of the UWB. Besides, a range of an operating frequency band of the antenna 200 can be adjusted by adjusting a width of a slot between the radiating patches 211. This helps further expand a bandwidth of the antenna 200.

Figure 29:
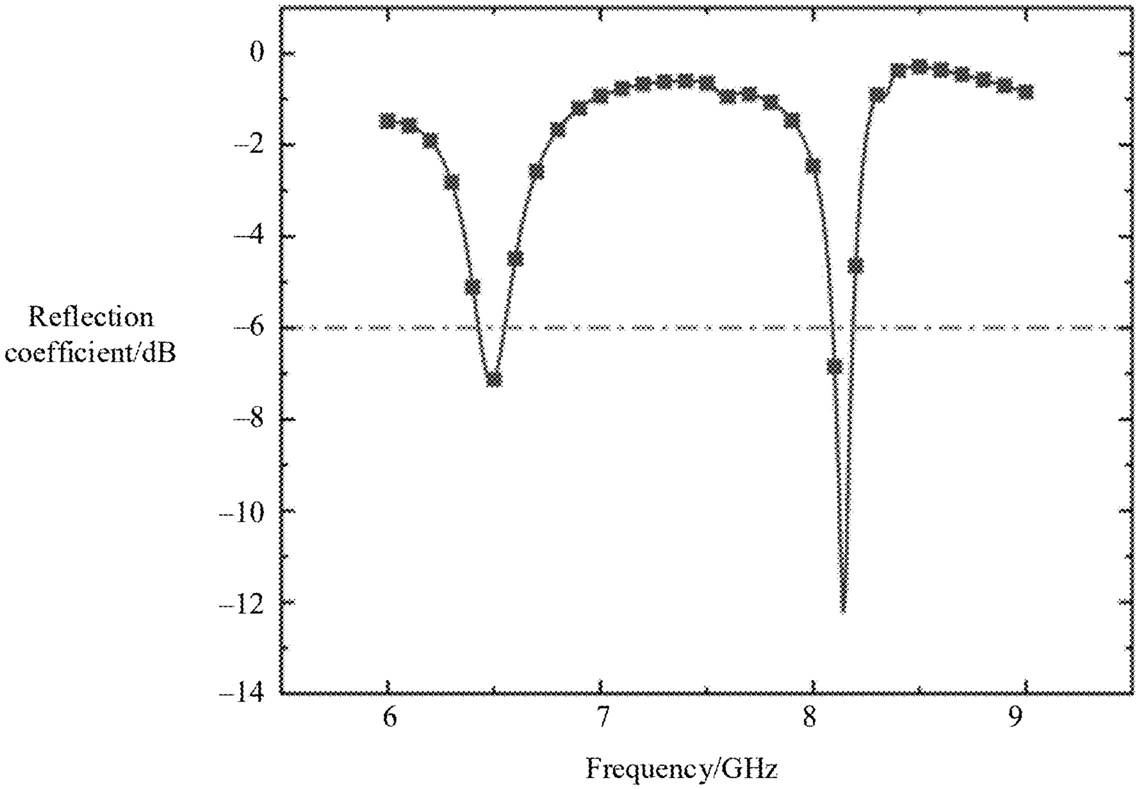
FIG. 29 is a diagram of a simulation result of a reflection coefficient of the antenna shown in FIG. 24.
Figure 30:
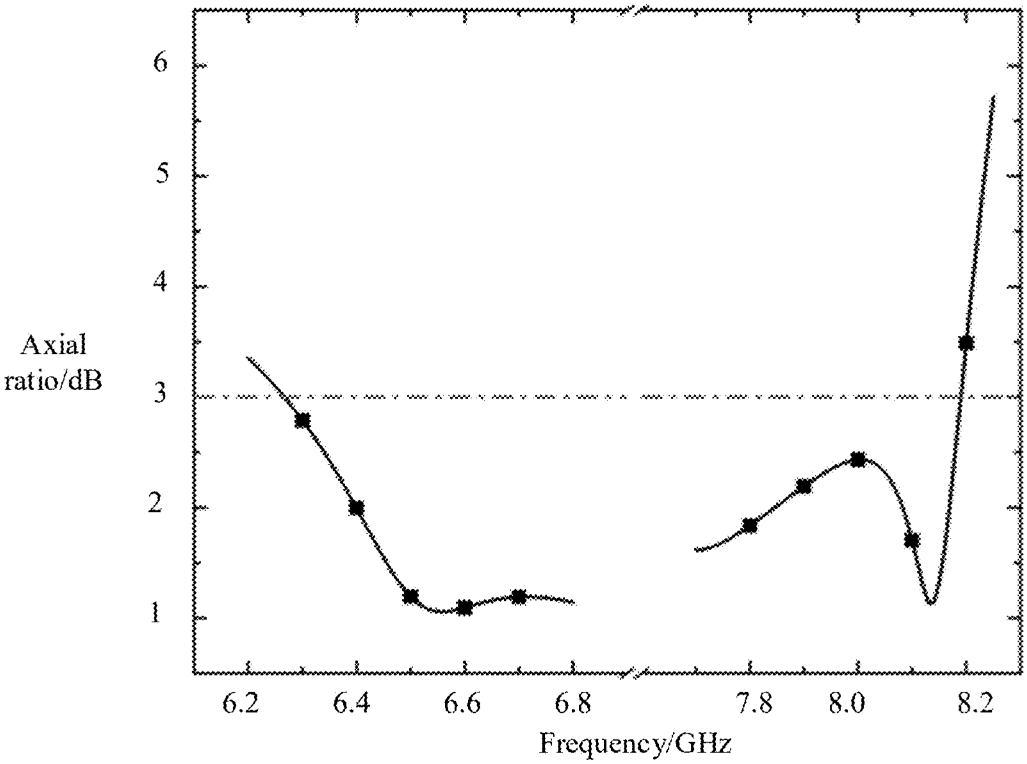
FIG. 30 is a diagram of a simulation result of an axial ratio of the antenna shown in FIG. 24.
Figure 31:
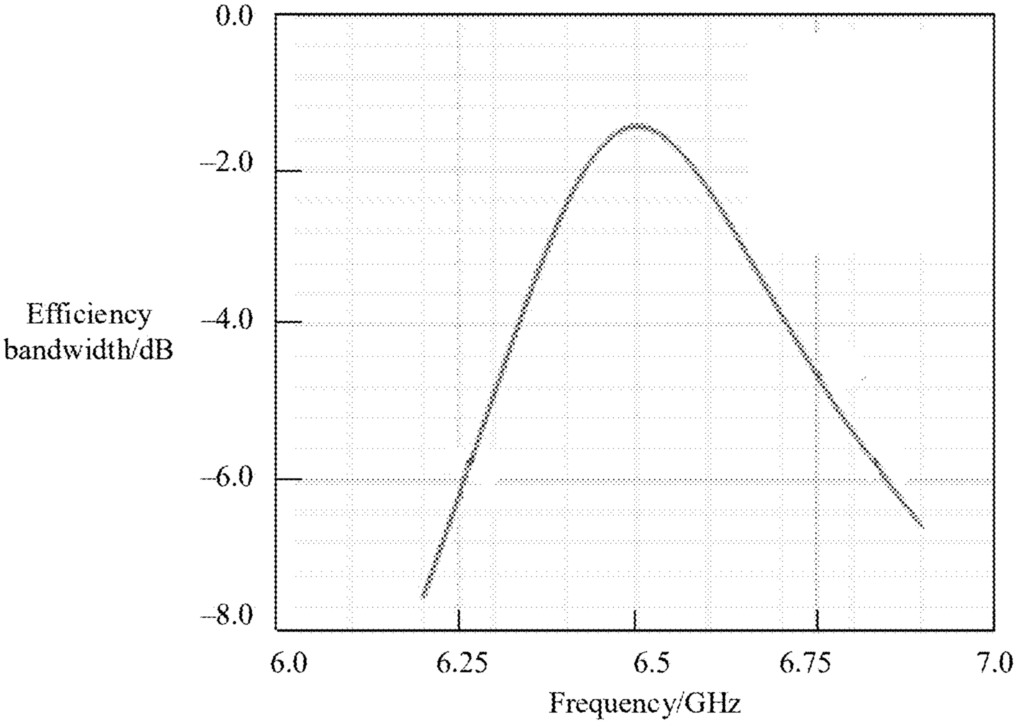
FIG. 31 is a diagram of an example of a simulation result of an efficiency bandwidth of the antenna shown in FIG. 24.
Figure 32:
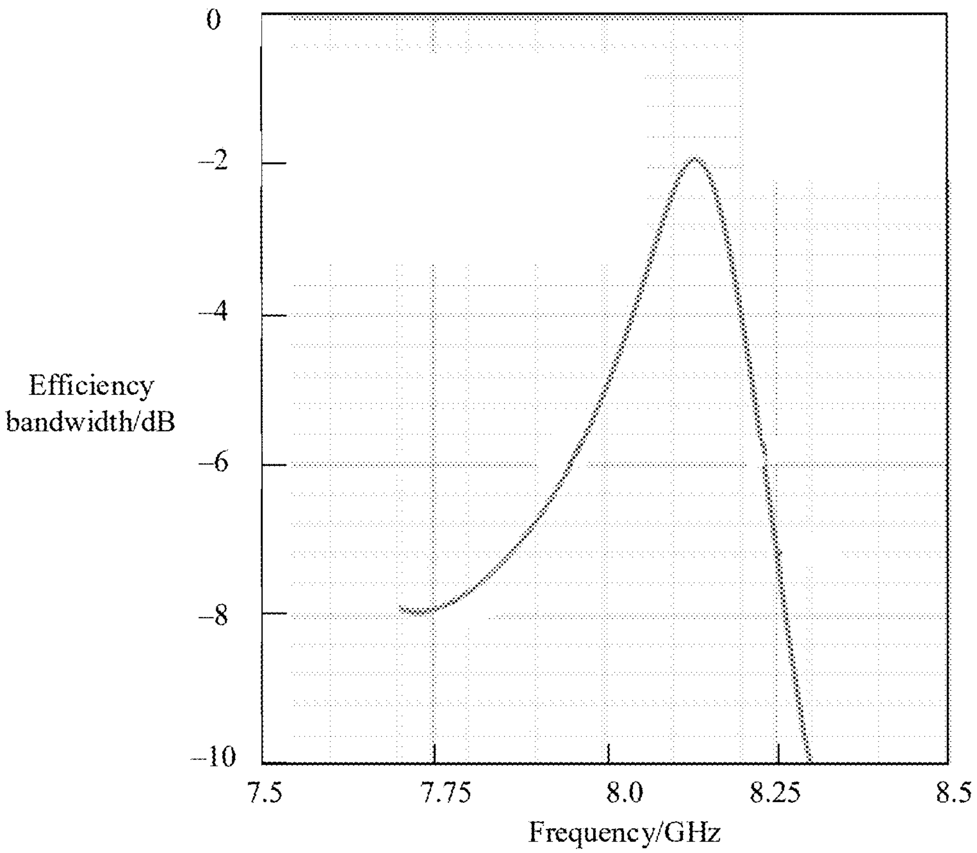
FIG. 32 is a diagram of another example of a simulation result of an efficiency bandwidth of the antenna shown in FIG. 24.
Figure 33:
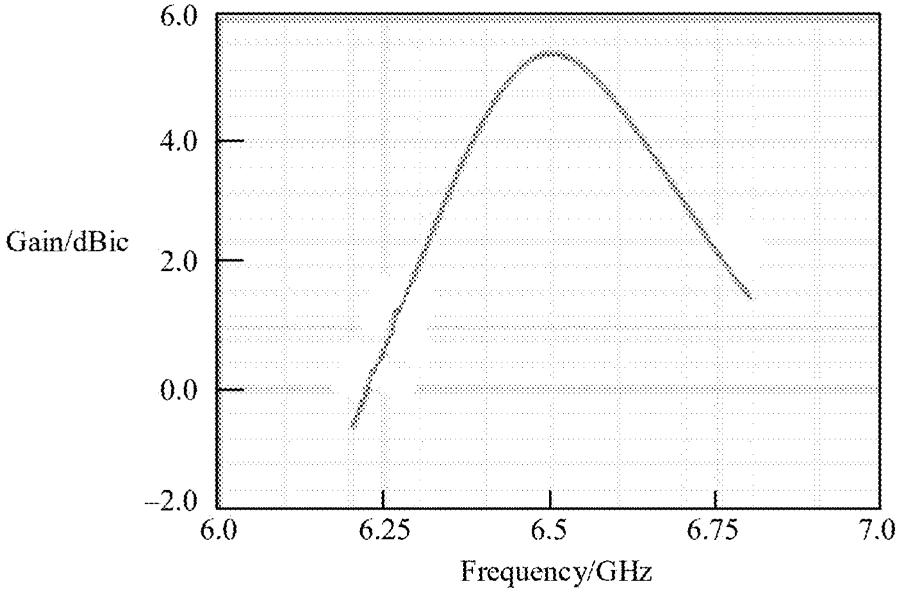
FIG. 33 is a diagram of an example of a simulation result of a circular polarization gain of the antenna shown in FIG. 24.
Figure 34:
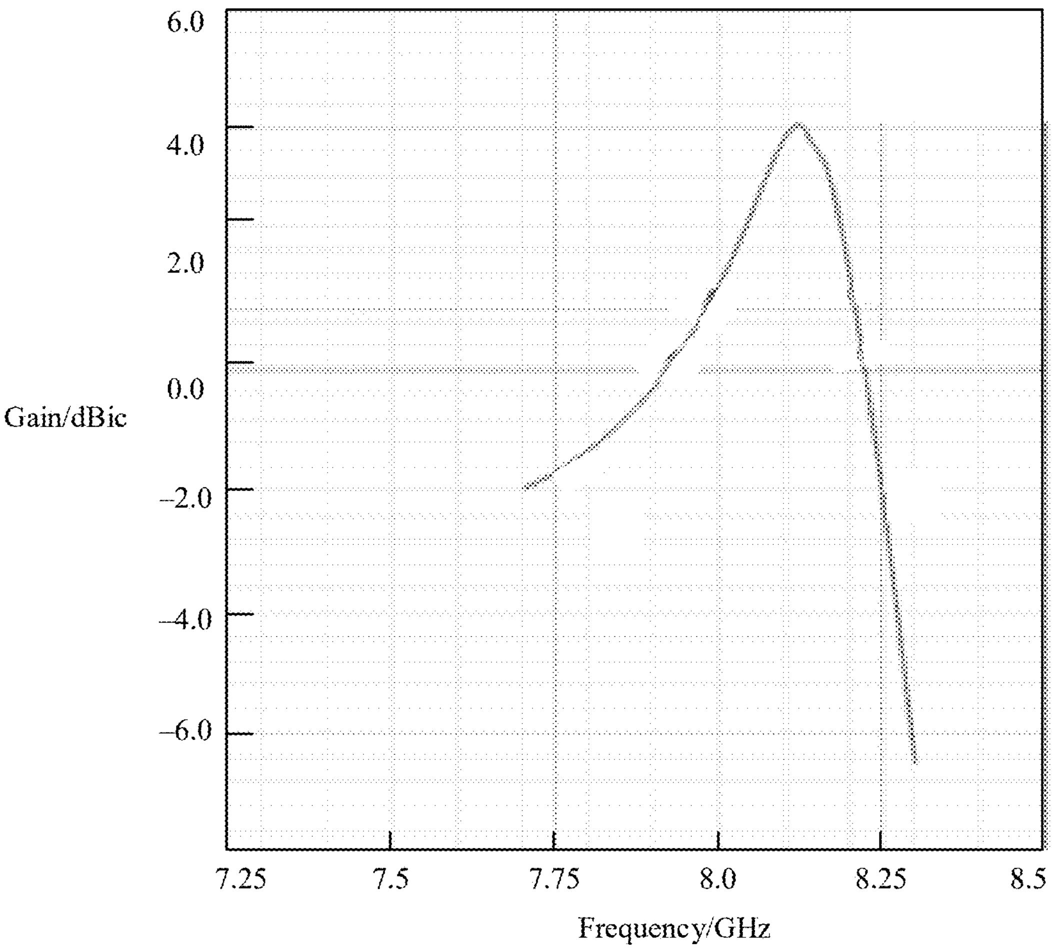
FIG. 34 is a diagram of another example of a simulation result of a circular polarization gain of the antenna shown in FIG. 24.

FIG. 29 to FIG. 34 are diagrams of simulation results of the antenna shown in FIG. 24. FIG. 29 is a diagram of a simulation result of a reflection coefficient of the antenna shown in FIG. 24. FIG. 30 is a diagram of a simulation result of an axial ratio of the antenna shown in FIG. 24. FIG. 31 and FIG. 32 are diagrams of simulation results of efficiency bandwidths of the antenna shown in FIG. 24. FIG. 33 and FIG. 34 are diagrams of simulation results of circular polarization gains of the antenna shown in FIG. 24.

As shown in FIG. 29, the antenna has two operating frequency bands. The two operating frequency bands can cover dual bands, Channel 5 and Channel 9, in the UWB frequency band, and center frequencies are 6.5 GHz and 8 GHz, which can meet a communication requirement. In addition, the antenna implements a wide impedance bandwidth. With the reflection coefficient less than −6 dB as a limit, the impedance bandwidth of the antenna is 6.43 GHz to 6.55 GHz and 8.09 GHz to 8.19 GHz.

As shown in FIG. 30, axial ratios of the antenna in two frequency bands near 6.5 GHz and 8.0 GHz are basically less than 3 dB. The antenna has a good circular polarization radiation characteristic in the two frequency bands, Channel 5 and Channel 9, in the UWB frequency band, which can meet the communication requirement.

With reference to FIG. 31 and FIG. 32, the antenna has a wide efficiency bandwidth. With the efficiency bandwidth less than −6 dB as a limit, the efficiency bandwidth of the antenna is 6.26 GHz to 6.85 GHz and 7.95 GHz to 8.23 GHz.

With reference to FIG. 33 and FIG. 34, a gain of the antenna in the Channel 5 frequency band (6.25 GHz to 6.75 GHz) is greater than 0.5 dBic, and a gain of the antenna in a rough frequency band of 300 MHz within the Channel 9 frequency band (7.75 GHz to 8.25 GHz) is greater than 0 dBic. Therefore, the antenna has a stable gain, and can meet the communication requirement.

Figure 35:
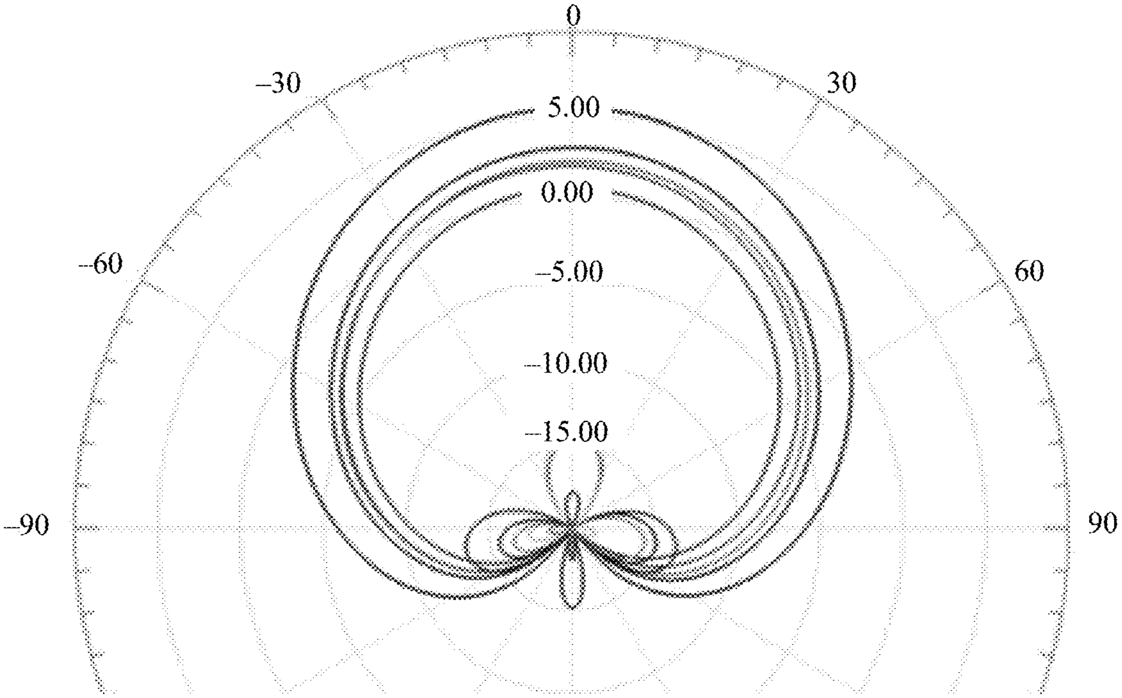
FIG. 35 is a radiation pattern of the antenna shown in FIG. 24 on an xoy plane at 6.35 GHz, 6.5 GHz, 6.75 GHz, 7.75 GHz, 8.0 GHz, and 8.15 GHz.
Figure 36:
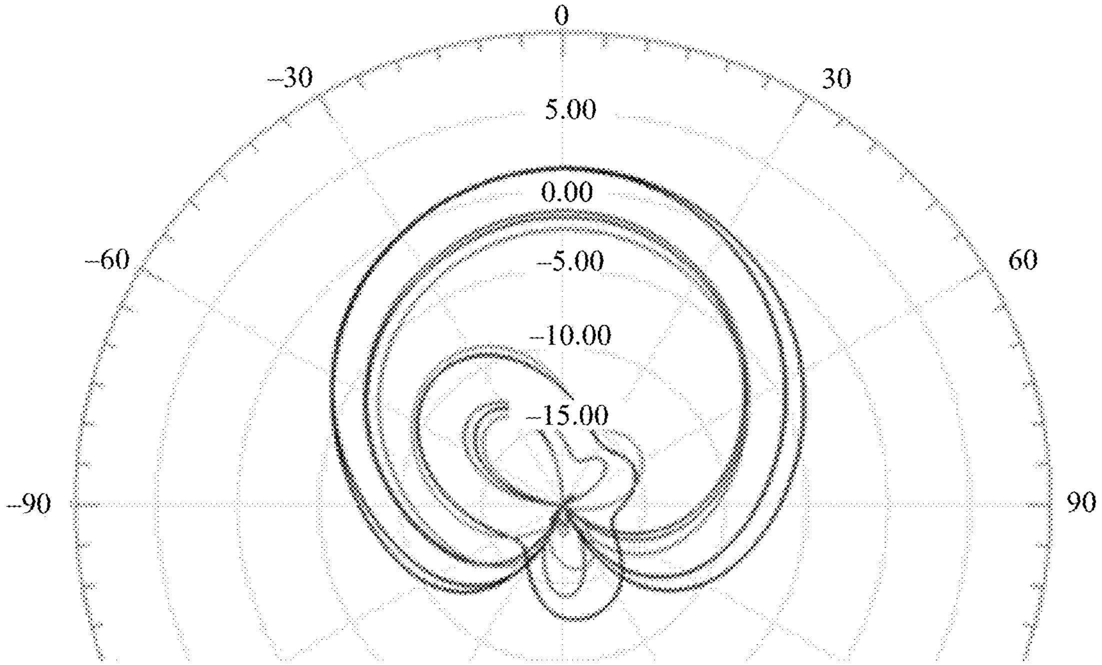
FIG. 36 is a radiation pattern of the antenna shown in FIG. 24 on a yoz plane at 6.35 GHz, 6.5 GHz, 6.75 GHz, 7.75 GHz, 8.0 GHz, and 8.15 GHz.

FIG. 35 is a radiation pattern of the antenna shown in FIG. 24 on an xoy plane at 6.35 GHz, 6.5 GHz, 6.75 GHz, 7.75 GHz, 8.0 GHz, and 8.15 GHz. FIG. 36 is a radiation pattern of the antenna shown in FIG. 24 on a yoz plane at 6.35 GHz, 6.5 GHz, 6.75 GHz, 7.75 GHz, 8.0 GHz, and 8.15 GHz.

With reference to FIG. 35 and FIG. 36, in 6.25 GHz to 6.75 GHz, cross polarization of the antenna is less than −15 dB, and in 7.75 GHz to 8.25 GHz, the cross polarization of the antenna is less than −10 dB. The antenna has low cross polarization, and can meet the communication requirement.

Figure 37:
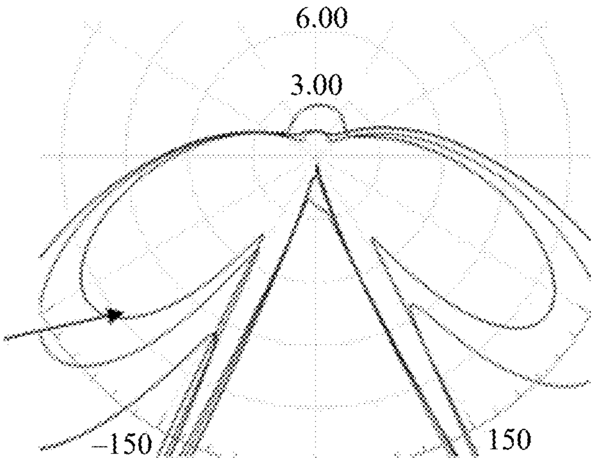
FIG. 37 is an axial ratio pattern of the antenna shown in FIG. 24 on an xoy plane at 6.35 GHz, 6.5 GHz, 6.75 GHz, 7.75 GHz, 8.0 GHz, and 8.15 GHz.
Figure 38:
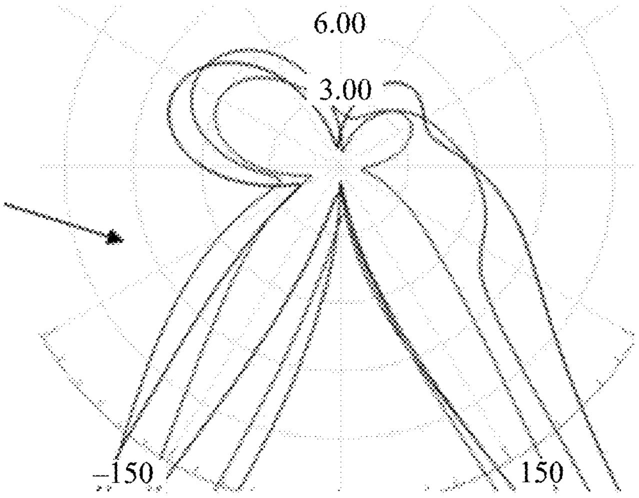
FIG. 38 is an axial ratio pattern of the antenna shown in FIG. 24 on a yoz plane at 6.35 GHz, 6.5 GHz, 6.75 GHz, 7.75 GHz, 8.0 GHz, and 8.15 GHz.

FIG. 37 is an axial ratio pattern of the antenna shown in FIG. 24 on the xoy plane at 6.35 GHz, 6.5 GHz, 6.75 GHz, 7.75 GHz, 8.0 GHz, and 8.15 GHz. FIG. 38 is an axial ratio pattern of the antenna shown in FIG. 24 on a yoz plane at 6.35 GHz, 6.5 GHz, 6.75 GHz, 7.75 GHz, 8.0 GHz, and 8.15 GHz.

With reference to FIG. 37 and FIG. 38, the antenna implements wide axial ratio angles at 6.35 GHz, 6.5 GHz, 6.75 GHz, 7.75 GHz, 8.0 GHz, and 8.15 GHz. Axial ratio angles of the antenna on the xoy plane and the xoz plane corresponding to the foregoing frequencies are shown in Table 2.

TABLE 2

| | xoy plane | xoz plane |
|---|---|---|
| 6.35 GHz | ±40° | ±70° |
| 6.5 GHz | ±60° | ±70° |
| 6.75 GHz | ±70° | ±70° |
| 7.75 GHz | ±40° | ±25° |
| 8.0 GHz | ±80° | ±20° |
| 8.15 GHz | ±30° | ±20° |

Figure 39:
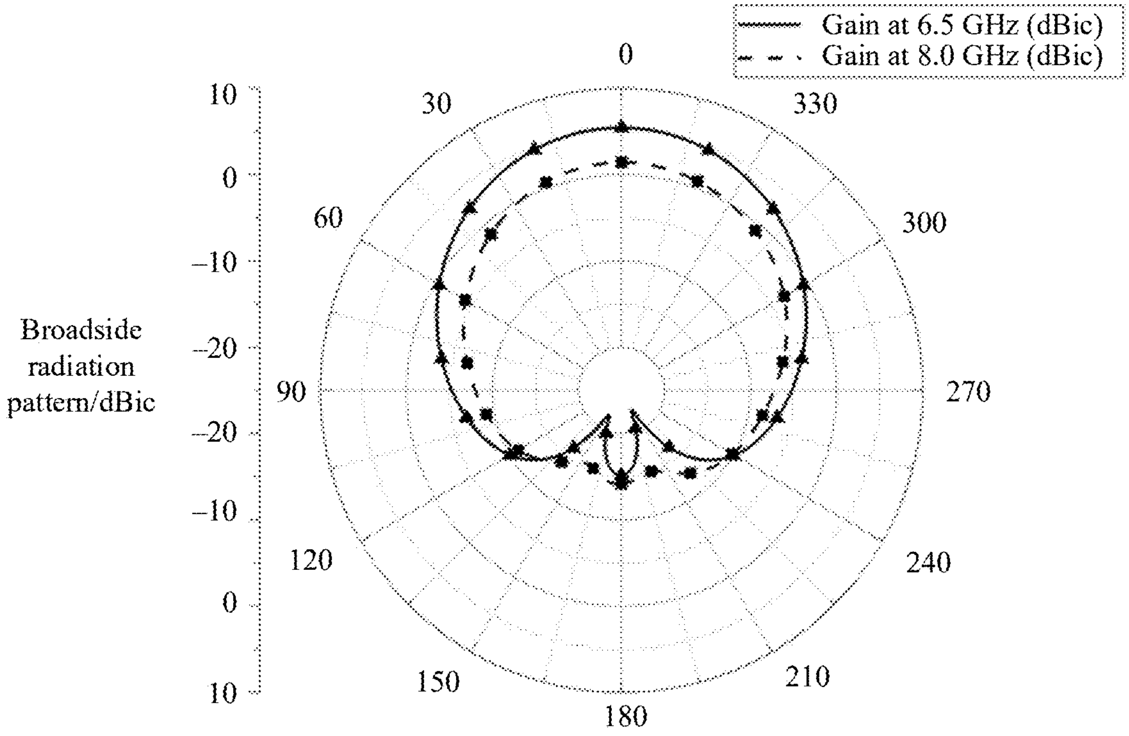
FIG. 39 is a radiation pattern of the antenna shown in FIG. 24 at 6.5 GHz and 8.0 GHz.

FIG. 39 is a radiation pattern of the antenna shown in FIG. 24 at 6.5 GHz and 8.0 GHz. As shown in FIG. 39, at 6.5 GHz and 8.0 GHz, the antenna implements a circular polarization gain greater than 1 dBic, and a maximum gain occurs at an angle of 0°. The antenna has the broadside radiation characteristic, and can meet the communication requirement.

Figure 40:
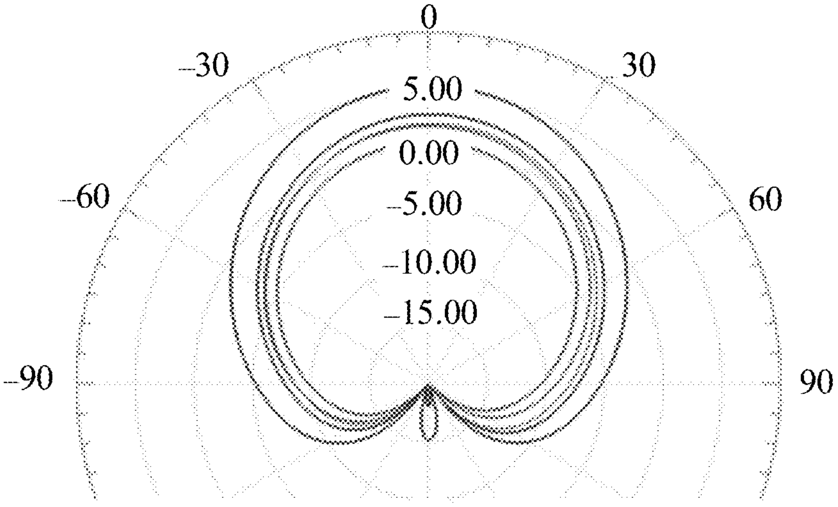
FIG. 40 is a radiation pattern of the antenna shown in FIG. 24 at 6.35 GHz, 6.5 GHz, and 6.75 GHz.

FIG. 40 is a radiation pattern of the antenna shown in FIG. 24 at 6.35 GHz, 6.5 GHz, and 6.75 GHz. As shown in FIG. 40, at 6.35 GHz, 6.5 GHz, and 6.75 GHz, a beam coverage angle of the antenna in the radiation pattern may be ±40°. The antenna has a wide beam coverage angle, and can meet the communication requirement.

Figure 41:
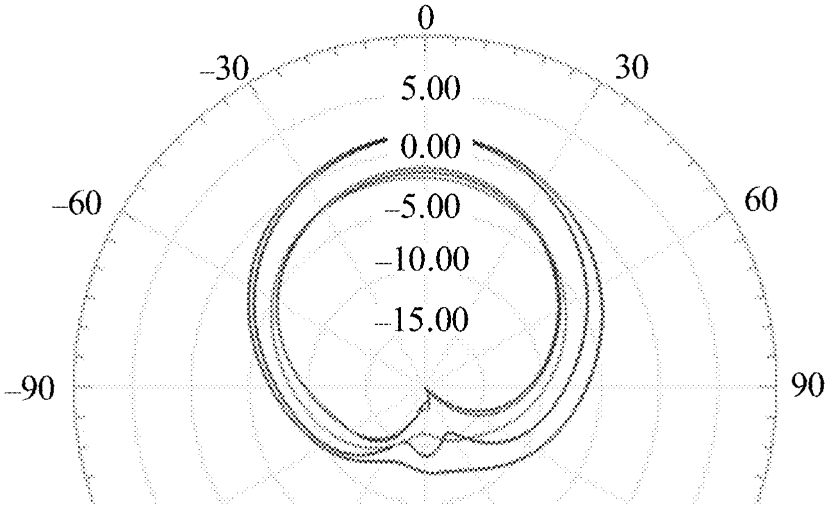
FIG. 41 is a radiation pattern of the antenna shown in FIG. 2 at 7.75 GHz, 8.0 GHz, and 8.15 GHz.

FIG. 41 is a radiation pattern of the antenna shown in FIG. 2 at 7.75 GHz, 8.0 GHz, and 8.15 GHz. As shown in FIG. 41, at 7.75 GHz, 8.0 GHz, and 8.15 GHz, a beam coverage angle of the antenna in the radiation pattern may be ±39°. The antenna has a wide beam coverage angle, and can meet the communication requirement.

Figure 42:
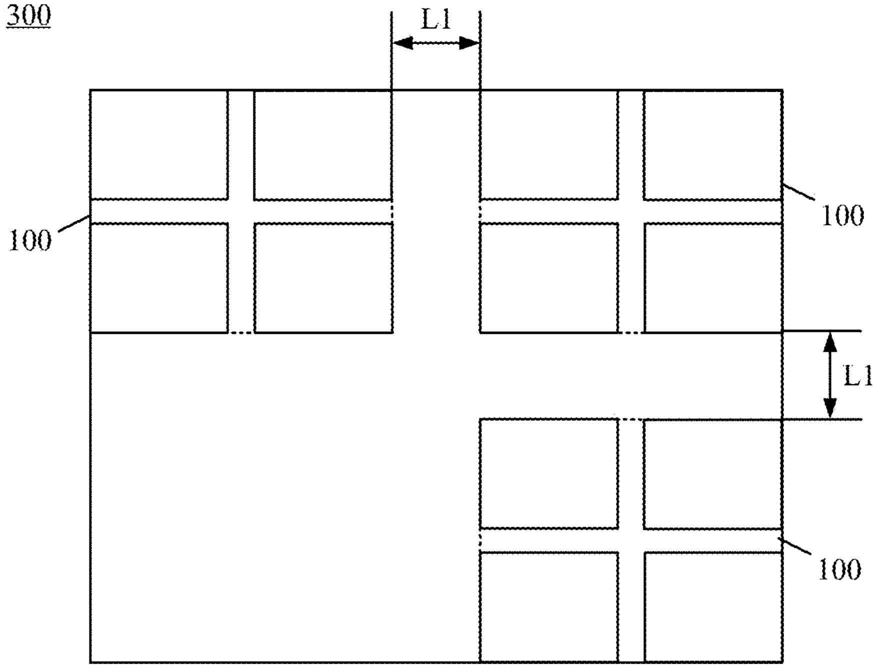
FIG. 42 is a diagram of a structure of an antenna array according to an embodiment of this application.

FIG. 42 is a diagram of a structure of an antenna array 300 according to an embodiment of this application. The antenna array 300 may be used in the electronic device 10 shown in FIG. 1.

The antenna array 300 may include a plurality of antennas, and the antenna may be the antenna 200 shown in FIG. 2.

It should be understood that a quantity of antennas in the antenna array 300 is not limited in this application. In addition, for descriptions of the antenna 100, refer to the foregoing related descriptions. Details are not described herein again.

In an example, as shown in FIG. 42, the antenna array 300 may include three antennas 100, and the three antennas 100 may be distributed in two rows and two columns.

In some embodiments, to meet a requirement of miniaturization of the antenna array 300, a distance L1 between two adjacent antennas 100 in the antenna array 300 may be less than or equal to one tenth of a first wavelength. For example, horizontal dimensions of the antenna array 300 may be 35 mm×35 mm.

It should be understood that for descriptions of the first wavelength, refer to the foregoing description. Details are not described herein again.

Figure 43:
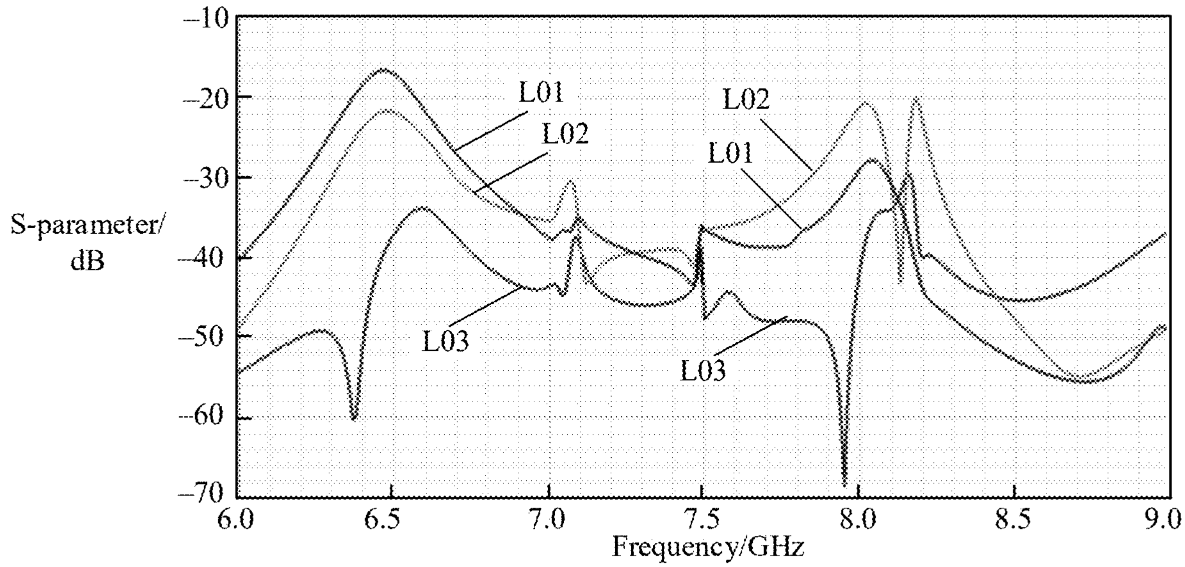
FIG. 43 is a diagram of a simulation result of an S-parameter of the antenna array shown in FIG. 42.

FIG. 43 is a diagram of simulation results of S-parameters when the antenna array 300 shown in FIG. 42 includes the three antennas 100.

As shown by three curves L01, L02, and L03 of the S-parameters shown in FIG. 43, in a frequency band of Channel 5, element isolation between the antennas 100 in the antenna array 300 is greater than 16 dB, and in a frequency band of Channel 9, element isolation between the antennas 100 in the antenna array 300 is greater than 19 dB. The antenna array 300 has good isolation and meets a communication requirement.

The following Table 3 further shows related parameters when the antenna array 300 includes the three antennas 100.

TABLE 3

| Parameter | |
|---|---|
| Ground dimensions | 140 mm × 70 mm |
| Radiation region dimensions | 35 mm × 35 mm |
| Dielectric thickness | ≤0.7 mm |
| Coverage frequency band | UWB Channel 5 (6489.6 ± 499.2 MHz) & Channel 9 (7987.2 ± 499.2 MHz) |
| Quantity of antenna elements | 3 |
| Polarization manner | Circular polarization |
| Axial ratio | <3 dB |
| Beam coverage angle | ±60° |
| Cross polarization | <15 dB |
| Total efficiency of an antenna | >−6 dB |
| Antenna gain | Greater than 1 dBi in 6.5 GHz and greater than 0 dBi in 8 GHz |
| Radiation pattern | Broadside radiation pattern |
| Antenna element isolation | >15 dB |
| Return loss | >6 dB |

It should be noted that the dielectric thickness in Table 3 may be understood as a total thickness of the first dielectric substrate 171, the second dielectric substrate 172, the third dielectric substrate 173, the fourth dielectric substrate 174, and the fifth dielectric substrate 175 shown in FIG. 2.

It should be understood that a related parameter of the antenna array 300 shown in Table 3 may be adjusted by adjusting a width of a slot between radiating patches 111 in the antenna 100. For example, the following Table 4 schematically shows related parameters of the antenna array 300 corresponding to different widths of the slot.

TABLE 4

| Parameter | Group 1 | Group 2 |
|---|---|---|
| Horizontal dimensions of a radiating patch layer 110 | 16.2 mm × 16.2 mm | 16 mm × 16 mm |

TABLE 4-continued

| Parameter | Group 1 | Group 2 |
|---|---|---|
| Dielectric thickness | 0.7 mm | 0.7 mm |
| Impedance bandwidth | 130 MHz/90 MHz | 90 MHz/100 MHz |
| Efficiency bandwidth | 6.28 GHz to 6.8 GHz (500 MHz); and 7.86 GHz to 8.2 GHz (340 MHz) | 6.32 GHz to 6.76 GHz (440 MHz); and 7.86 GHz to 8.24 GHz (380 MHz) |
| Axial ratio bandwidth | 6.26 GHz to 8.3 GHz | 6.30 GHz to 8.34 GHz |
| Beam coverage angle | ±39°/40° | ±38°/40° |
| Cross polarization | <−17 dB/−11 dB | <−15 dB/−13 dB |
| Antenna gain | Greater than 1 dBi in 6.5 GHz and greater than 0 dBi in 8 GHz | Greater than 0.5 dBi in 6.5 GHz and greater than 0 dBi in 8 GHz |
| Radiation pattern | Broadside radiation pattern | Broadside radiation pattern |
| Antenna element isolation | >16 dB | >16 dB |

The antenna array 300 provided in this application has a low profile, dual wideband, miniaturization, and a wide axial ratio bandwidth, and is applicable to a built-in positioning antenna system of a small electronic device represented by a mobile phone.

Figure 44:
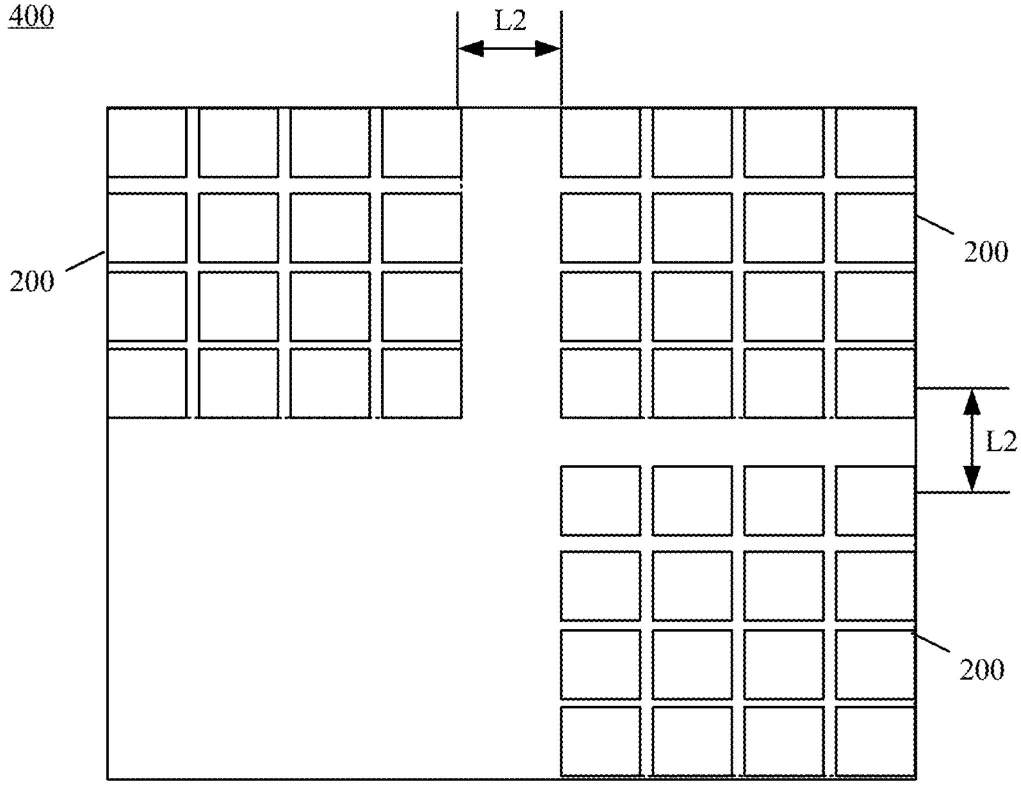
FIG. 44 is a diagram of a structure of another antenna array according to an embodiment of this application.

FIG. 44 is a diagram of a structure of another antenna array 400 according to an embodiment of this application. The antenna array 400 may be used in the electronic device 10 shown in FIG. 1.

Similar to the antenna array 300 shown in FIG. 42, the antenna array 400 may include a plurality of antennas.

Different from the antenna array 300 shown in FIG. 42, the antenna in the antenna array 400 may be the antenna 300 shown in FIG. 24.

It should be understood that a quantity of antennas in the antenna array 400 is not limited in this application. In addition, for descriptions of the antenna 200, refer to the foregoing related descriptions. Details are not described herein again.

In an example, as shown in FIG. 44, the antenna array 400 may include three antennas 200, and the three antennas 200 may be distributed in two rows and two columns.

It should be understood that, for descriptions of the antenna array 400, refer to the related descriptions of the antenna array 300. Details are not described herein again.

Figure 45:
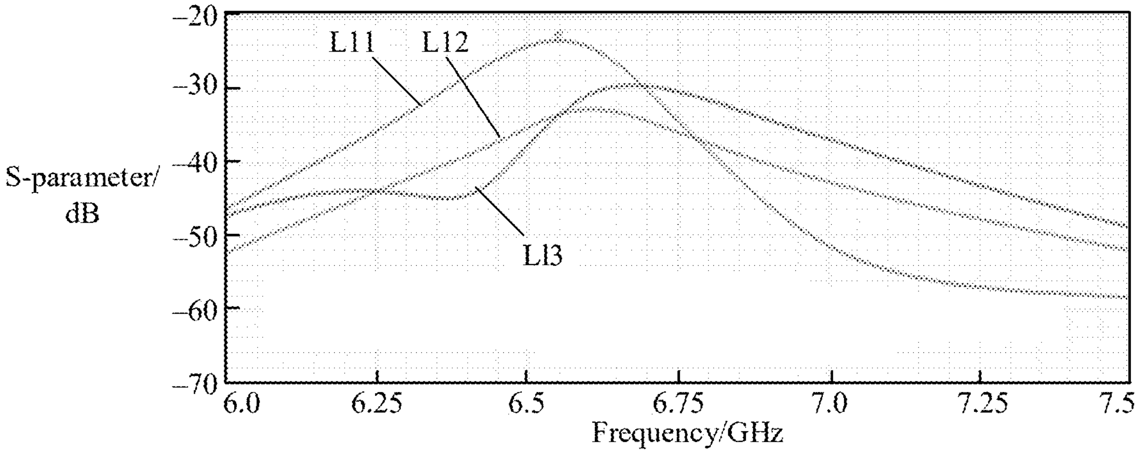
FIG. 45 is a diagram of a simulation result of an S-parameter of the antenna array shown in FIG. 44.
Figure 46:
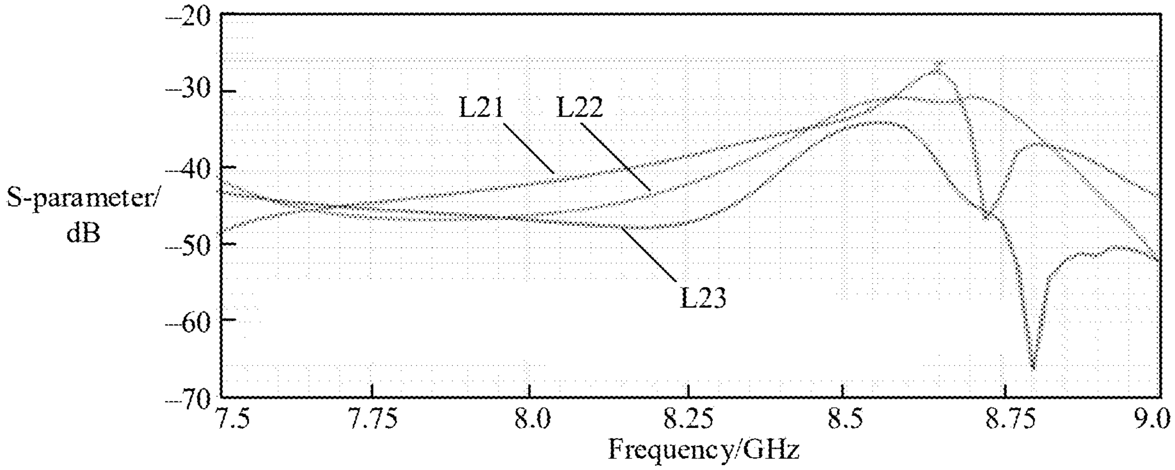
FIG. 46 is a diagram of a simulation result of an S-parameter of the antenna array shown in FIG. 44.

FIG. 45 and FIG. 46 are diagrams of simulation results of S-parameters when the antenna array 400 shown in FIG. 44 includes the three antennas 200.

With reference to three curves L11, L12, and L13 of the S-parameters shown in FIG. 45 and three curves L21, L22, and L23 of the S-parameters shown in FIG. 46, in a frequency band of Channel 5, element isolation between the antennas 200 in the antenna array 400 is greater than 16.5 dB, and in a frequency band of Channel 9, element isolation between the antennas 200 in the antenna array 400 is greater than 16 dB. The antenna array 400 has good isolation and meets a communication requirement.

It should be understood that when the antenna array 400 includes the three antennas 200, the antenna array 400 may also implement the related parameters shown in Table 3. In addition, a related parameter of the antenna array 300 shown in Table 4 may be adjusted by adjusting a width of a slot between radiating patches 211 in the antenna 200. For example, the following Table 5 schematically shows related parameters of the antenna array 400 corresponding to different widths of the slot.

TABLE 5

| Parameter | Group 1 | Group 2 |
|---|---|---|
| Horizontal dimensions of a radiating patch layer 110 | 16.4 mm × 16.4 mm | 16.2 mm × 16.2 mm |
| Dielectric thickness | 0.6 mm | 0.6 mm |
| Impedance bandwidth | 120 MHz/100 MHz | 60 MHz/110 MHz |
| Efficiency bandwidth | 6.26 GHz to 6.85 GHz (590 MHz); and 7.95 GHz to 8.23 GHz (280 MHz) | 6.22 GHz to 6.82 GHz (600 MHz); and 7.88 GHz to 8.21 GHz (330 MHz) |
| Axial ratio bandwidth | 6.27 GHz to 8.19 GHz | 6.34 GHz to 8.15 GHz |
| Beam coverage angle | ±40°/42° | ±40°/42° |
| Cross polarization | <−15 dB/−10 dB | <−13 dB/−8 dB |
| Antenna gain | Greater than 0.5 dBi in 6.5 GHz and greater than 0 dBi in 8 GHz | Greater than 1.7 dBi in 6.5 GHz and greater than 0 dBi in 8 GHz |
| Radiation pattern | Broadside radiation pattern | Broadside radiation pattern |
| Antenna element isolation | >16 dB or 16 dB | >16 dB or 15.5 dB |

The antenna array 400 provided in this application has a low profile, dual wideband, miniaturization, and a wide axial ratio bandwidth, and is applicable to a built-in positioning antenna system of a small electronic device represented by a mobile phone. In addition, positioning functions in a horizontal direction and a vertical direction can be implemented through collaboration between antennas.

A person skilled in the art may use different methods to implement the described functions for each specific application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or another form.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An antenna comprising a first antenna structure having a radiating patch layer, a ring-shaped metal layer, a first metal layer, and a feed element, wherein the ring-shaped metal layer is located between the radiating patch layer and the first metal layer;

the radiating patch layer comprises four radiating patches, and the four radiating patches are distributed in a 2×2 array, wherein there is a slot between two adjacent radiating patches of the four radiating patches in a row direction and a column direction of the array;

the ring-shaped metal layer is disposed in correspondence with a peripheral edge part of the radiating patch layer, and the ring-shaped metal layer is coupled and connected to the radiating patch layer;

a plurality of metal columns are disposed on a side that is of the first metal layer and that faces the ring-shaped metal layer, and each of the plurality of metal columns is electrically connected to the ring-shaped metal layer; and the feed element is electrically connected to the radiating patch layer, and based on the feed element performing feeding, there is a first phase difference between electrical signals on two adjacent radiating patches of the four radiating patches in a clockwise arrangement direction of the four radiating patches.

2. The antenna according to claim 1, wherein the first phase difference is 90°±45°.

3. The antenna according to claim 1, wherein the first antenna structure further comprises a feed structure, and wherein the feed structure comprises four feed probes and a rotating feed network;

the four feed probes are disposed between the ring-shaped metal layer and the first metal layer, and the rotating feed network is disposed on a side of the first metal layer that is away from the ring-shaped metal layer;

the rotating feed network comprises a common input port and four branch output ports; and the feed element is electrically connected to the common input port that is electrically connected to the four branch output ports, the four branch output ports are electrically connected to the four feed probes respectively, and the four feed probes are electrically connected to the four radiating patches respectively.

4. The antenna according to claim 3, wherein a projection of each of the four feed probes in a first direction is located on an inner periphery of a projection of the ring-shaped metal layer in the first direction, and wherein the first direction is a direction perpendicular to the radiating patch layer.

5. The antenna according to claim 1, wherein the first antenna structure further comprises a grounding plane located on a side of a rotating feed network that is away from the first metal layer, and wherein the first antenna structure further comprises a first dielectric substrate, a second dielectric substrate, a third dielectric substrate, a fourth dielectric substrate, and a fifth dielectric substrate that are sequentially stacked;

the radiating patch layer is disposed on a surface that is of the first dielectric substrate and that is away from the second dielectric substrate;

the ring-shaped metal layer is disposed on a surface that is of the second dielectric substrate and that is away from the third dielectric substrate;

the four feed probes are disposed on a surface that is of the third dielectric substrate and that is away from the fourth dielectric substrate;

the first metal layer is disposed on a surface that is of the fourth dielectric substrate and that is away from the fifth dielectric substrate; and the rotating feed network is disposed on a surface that is of the fifth dielectric substrate and that faces the fourth dielectric substrate, and the grounding plane is disposed on a surface that is of the fifth dielectric substrate and that is away from the fourth dielectric substrate.

6. The antenna according to claim 5, wherein a total thickness of the first dielectric substrate, the second dielectric substrate, the third dielectric substrate, the fourth dielectric substrate, and the fifth dielectric substrate is less than or equal to 0.7 mm.

7. The antenna according to claim 1, wherein a width of the slot is greater than or equal to 0.1 mm, and is less than or equal to 0.6 mm.

8. The antenna according to claim 1, wherein the antenna comprises a plurality of antenna structures including the first antenna structure, wherein a distance between two adjacent antenna structures is less than or equal to one tenth of a first wavelength, and wherein the first wavelength is a wavelength corresponding to an operating frequency band of the first antenna structure.

9. The antenna according to claim 8, wherein the antenna comprises three antenna structures, and the three antenna structures are distributed in two rows and two columns.

10. An antenna comprising a radiating patch layer, a ring-shaped metal layer, and a feed structure located between the radiating patch layer and the ring-shaped metal layer;

the radiating patch layer comprises sixteen radiating patches distributed in a 4×4 array, wherein there is a slot between two adjacent radiating patches of the sixteen radiating patches in a row direction and a column direction of the array;

the ring-shaped metal layer is disposed in correspondence with a peripheral edge part of the radiating patch layer, a plurality of metal columns are disposed on a side of the ring-shaped metal layer that faces the radiating patch layer, and each of the plurality of metal columns is electrically connected to the radiating patch layer;

the feed structure comprises a first feed port and a second feed port, and the first feed port and the second feed port are electrically connected to the radiating patch layer;

based on the first feed port performing feeding, an electrical signal on the radiating patch layer is a first electrical signal, and based on the second feed port performing feeding, an electrical signal on the radiating patch layer is a second electrical signal; and amplitudes of the first electrical signal and the second electrical signal are equal, and a phase difference between the first electrical signal and the second electrical signal is 180°±45°.

11. The antenna according to claim 10, wherein the feed structure comprises a first feed line, a second feed line, and a third feed line, wherein the first feed line is parallel to the second feed line, and wherein the second feed line is perpendicular to the third feed line;

a first end of the first feed line is electrically connected to the second feed line, and the second feed line is electrically connected to the radiating patch layer;

the third feed line is electrically connected to the radiating patch layer; and a second end of the first feed line comprises the first feed port, and the third feed line comprises the second feed port.

12. The antenna according to claim 11, wherein the first feed line, the second feed line, and the third feed line are sequentially disposed in a direction from the ring-shaped metal layer to the radiating patch layer.

13. The antenna according to claim 11, wherein the antenna further comprises a matching patch layer located between the radiating patch layer and the feed structure, wherein the matching patch layer is coupled and connected to the radiating patch layer, and wherein the matching patch layer is electrically connected to the second feed line and the third feed line; and the matching patch layer comprises four metal patches that are distributed in a 2×2 array.

14. The antenna according to claim 13, wherein the plurality of metal columns are located on an outer periphery of the matching patch layer.

15. The antenna according to claim 13, wherein the antenna further comprises a first dielectric substrate, a second dielectric substrate, a third dielectric substrate, a fourth dielectric substrate, and a fifth dielectric substrate that are sequentially stacked;

the radiating patch layer is disposed on a surface of the first dielectric substrate that is away from the second dielectric substrate;

the matching patch layer is disposed on a surface of the second dielectric substrate that is away from the third dielectric substrate;

the third feed line is disposed on a surface of the third dielectric substrate that is away from the fourth dielectric substrate;

the second feed line is disposed on a surface of the fourth dielectric substrate that is away from the fifth dielectric substrate; and the first feed line is disposed on a surface of the fifth dielectric substrate that faces the fourth dielectric substrate.

16. The antenna according to claim 15, wherein a total thickness of the first dielectric substrate, the second dielectric substrate, the third dielectric substrate, the fourth dielectric substrate, and the fifth dielectric substrate is less than or equal to 0.7 mm.

17. The antenna according to claim 15, wherein the antenna further comprises a grounding plane located on a surface of the fifth dielectric substrate that is away from the fourth dielectric substrate; and the grounding plane comprises the first feed port and the second feed port.

18. The antenna according to claim 10, wherein a width of the slot is greater than or equal to 0.1 mm, and is less than or equal to 0.6 mm.

19. An electronic device comprising an antenna, wherein the antenna comprises a first antenna structure having a radiating patch layer, a ring-shaped metal layer, a first metal layer, and a feed element, and wherein the ring-shaped metal layer is located between the radiating patch layer and the first metal layer;

the radiating patch layer comprises four radiating patches distributed in a 2×2 array, wherein there is a slot between two adjacent radiating patches of the four radiating patches in a row direction and a column direction of the array;

the ring-shaped metal layer is disposed in correspondence with a peripheral edge part of the radiating patch layer, wherein the ring-shaped metal layer is coupled to the radiating patch layer;

a plurality of metal columns are disposed on a side of the first metal layer that faces the ring-shaped metal layer, and each of the plurality of metal columns is electrically connected to the ring-shaped metal layer; and the feed element is electrically connected to the radiating patch layer and, based on the feed element performing feeding, there is a first phase difference between electrical signals on two adjacent radiating patches of the four radiating patches in a clockwise arrangement direction of the four radiating patches.

20. The electronic device according to claim 19, wherein an operating frequency band of the first antenna structure comprises 5990.4 MHz to 6988.8 MHz and 7499 MHz to 8486.4 MHz.

* * * * *